US008488973B2

(12) United States Patent
Avenson et al.

(10) Patent No.: US 8,488,973 B2
(45) Date of Patent: Jul. 16, 2013

(54) SIGNAL PROCESSING WITHIN AN OPTICAL MICROPHONE

(75) Inventors: Brad D. Avenson, Pflugerville, TX (US); Caesar T. Garcia, Austin, TX (US); Neal Allen Hall, Austin, TX (US); Abidin Guclu Onaran, Austin, TX (US)

(73) Assignee: Silicon Audio, Inc., Austin, TX (US)

( * ) Notice: Subject to any disclaimer, the term of this patent is extended or adjusted under 35 U.S.C. 154(b) by 169 days.

(21) Appl. No.: 13/025,066

(22) Filed: Feb. 10, 2011

(65) Prior Publication Data

US 2011/0194857 A1 Aug. 11, 2011

Related U.S. Application Data

(60) Provisional application No. 61/303,501, filed on Feb. 11, 2010.

(51) Int. Cl.
*H04B 10/02* (2006.01)
*H04B 10/12* (2006.01)

(52) U.S. Cl.
USPC ............................ 398/133; 398/132; 398/134

(58) Field of Classification Search
USPC .................. 398/132–172; 381/150, 172, 369
See application file for complete search history.

(56) References Cited

U.S. PATENT DOCUMENTS 5,134,276 A 7/1992 Hobbs
5,815,581 A * 9/1998 Andersson .................... 381/321
6,643,025 B2 11/2003 Degertekin et al.
6,753,969 B2 6/2004 Degertekin et al.
7,116,430 B2 10/2006 Degertekin et al.
7,317,801 B1 * 1/2008 Amir ............................ 381/71.1
7,355,720 B1 4/2008 Carr
7,355,723 B2 * 4/2008 Carr .............................. 356/519
7,440,117 B2 10/2008 Degertekin et al.
7,485,847 B2 2/2009 Degertekin et al.
7,508,040 B2 3/2009 Nikkel et al.
7,518,737 B2 4/2009 Hall et al.
7,809,219 B2 10/2010 Kilic et al.

(Continued)

OTHER PUBLICATIONS

Maisto, Michelle "Motorola Droid, Google Nexus One Boosting Noise-Cancellation Market", eWeek, Feb. 4, 2010; 1 page; obtained from the internet: http://www.eweek.com/c/a/Mobile-and-Wireless/Motorola-Droid-Google-Nexus-One-Boosting-NoiseCancellation-Market-1439921; retrieval date: Jun. 20, 2011.

(Continued)

*Primary Examiner* — Kenneth N Vanderpuye
*Assistant Examiner* — Casey Kretzer
(74) *Attorney, Agent, or Firm* — Meyertons Hood Kivlin Kowert & Goetzel, P.C.; Jeffrey C. Hood; Joel L. Stevens

(57) ABSTRACT

Method for performing signal processing for an optical microphone. First and second signals corresponding to at least two beams may be generated or received. The first and second signals may be complementary, and may be based on signals provided by one or more photo detectors that receive the at least two beams after the beams return from a sensing structure. The first signal and the second signal may be subtracted to produce a third signal. A position of the sensing structure may be adjusted to cause the third signal to reach a first value, where the adjusting may be performed based on the third signal, and an audio output signal may be provided based on the third signal.

27 Claims, 28 Drawing Sheets

U.S. PATENT DOCUMENTS

| | | | | |
|---|---|---|---|---|
| 7,881,565 | B2 | 2/2011 | Kilic et al. | |
| 2002/0103035 | A1 * | 8/2002 | Lindsay | 473/151 |
| 2003/0038949 | A1 * | 2/2003 | Degertekin et al. | 356/498 |
| 2004/0002313 | A1 * | 1/2004 | Peace et al. | 455/234.1 |
| 2006/0193356 | A1 * | 8/2006 | Osiander et al. | 372/38.01 |
| 2007/0293913 | A1 * | 12/2007 | Cowan et al. | 607/57 |
| 2008/0025545 | A1 * | 1/2008 | Carr | 381/357 |
| 2008/0057875 | A1 * | 3/2008 | Kawashima | 455/67.14 |

OTHER PUBLICATIONS

Hobbs, P.C.D., Ultrasensitive laser measurements without tears. Applied Optics, 1997. 36(4): p. 903-920.

Dustin Carr, "MEMS and Optoelectronics Integration for Physical Sensors," Society of Experimental Mechanics Meeting, 2007.

Greywall, D.S., Micromachined optical-interference microphone. Sensors and Actuators A-Physical, 1999: p. 257-268.

P. Hobbs, Reaching the Shot Noise Limit for $10, Optics & Photonics News, pp. 17-23, Apr. 1991.

N. A. Hall, B. Bicen, M. K. Jeelani, W. Lee, S. Qureshi, M. Okandan, and F. L. Degertekin, "Micromachined microphones with diffraction-based optical displacement detection " Journal of the Acoustical Society of America, vol. 118(5), pp. 3000-3009, Nov. 2005.

N. A. Hall, R. Littrell, M. Okandan, B. Bicen, and F. L. Degertekin, "Micromachined optical microphone structures with low thermal-mechanical noise levels," Journal of the Acoustical Society of America, vol. 122 pp. 2031-2037, Oct. 2007.

U.S. Appl. No. 13/025,054, filed Feb. 10, 2011 Entitled: Optical Microphone Packaging.

* cited by examiner

SIGNAL PROCESSING WITHIN AN OPTICAL MICROPHONE

PRIORITY INFORMATION

This application claims benefit of priority of U.S. Provisional Application Ser. No. 61/303,501 titled "Optical Microphone Packaging" filed Feb. 11, 2010, whose inventor was Neal Allen Hall, which is hereby incorporated by reference in its entirety as though fully and completely set forth herein.

FEDERAL RIGHTS

This invention was made with government support under grant number 2R44DC009721, awarded by the National Institutes of Health (NIH). The government has certain rights in the invention.

FIELD OF THE INVENTION

The present invention relates to the field of microphones, and more particularly to a system and method for packaging optical, microelectromechanical microphones.

DESCRIPTION OF THE RELATED ART

Industry has continued to miniaturize various systems for inclusion in portable devices, such as mobile telephones and laptops, audio players, personal digital assistants (PDAs), etc. To this effect, Microelectromechanical systems (MEMS) which implement functionality for such devices have become increasingly prevalent in recent years.

Generally, these portable devices provide or receive audio data from the user. Accordingly, it is desirable to manufacture small, high-quality microphones, e.g., for incorporation into such devices.

SUMMARY OF THE INVENTION

Various embodiments are presented of a method for processing signals from, and within, an optical microphone.

First and second signals may be generated and/or received which correspond to at least two beams. The first and second signals may be complementary signals.

In some embodiments, the at least two beams may be created based on a common light source. For example, a light source may produce at least a first beam (or laser light). The first beam may produce a zero order reflection beam and a plurality of higher order diffracted beams, e.g., after returning (e.g., reflecting) from a sensing structure and possibly a diffraction grating of the microphone. These beams may be detected using one or more photo detectors. In some embodiments, there may be a photo detector for each received beam; however, the photo detectors may be discrete or monolithic, as desired. Accordingly, the first and second signals may be generated (e.g., by a circuit and/or the photo detectors) based on the intensity of the received beams via detection by the one or more photo detectors. In one embodiment, the first signal may be proportional to the intensity of the zero order reflection beam and the second signal may be proportional to the intensity of the sum of the plurality of higher order diffracted beams. For example, the first signal may be the original or a modified version of the signal provided by a photo detector corresponding to the zero order reflection beam. Similarly, the second signal may be the sum of the original or modified versions of the signals provided by the photo detectors receiving the higher order diffracted beams.

Alternatively, the at least two beams may be created based on one or more light sources (e.g., one for each beam), and the first and second signals may be based on reflections and/or transmissions of these beams, e.g., from or through the sensing structure. Thus, two separate beams may be generated and received, and the signals resulting from these beams (e.g., as detected by the photo detectors) may be complementary. Thus, these signals may be generated by the photo detectors and may be received by the circuit of the microphone. Both of the beams may be zero order reflection and/or transmission beams. Note that further embodiments and alternatives are envisioned other than the simple reflection or more complex diffraction schemes described above.

In some embodiments, the light source(s) described above may be pulsed according to a duty cycle in order to save power. In one embodiment, the duty cycle may be actively controlled based on ambient acoustic conditions, e.g., as detected by the microphone. Thus, the duty cycle of the laser can be changed depending on the environment the microphone is operated in. For example, if the ambient noise is high, e.g., above a certain threshold decibel level as measured with the optical microphone, the circuit may intelligently lower the light source duty cycle to save power. Alternatively, or additionally, the duty cycle may be controlled based on a mode of operation of the microphone, e.g., directional mode, normal mode, speech recognition mode, cardioid mode, etc.

The first signal and the second signal may be subtracted to produce a third signal. For example, the first and second signals may be subtracted using a current mirror. In some embodiments, the first and second signals may be current signals and the subtraction may be performed using the current signals (e.g., when the photo detectors are discrete). In these cases, the third signal may be converted to a voltage signal after subtraction using a current-to-voltage amplifier. However, in further embodiments, the first and second signals may be voltage signals (e.g., when the photo detectors are monolithic) and subtraction or other operations on the signals may be performed after they are converted to voltage signals. Different gains may be applied to individual signals before subtraction either in current domain or voltage domain in order to ensure that the resultant signal reaches a desired first value (e.g. zero).

A position of the sensing structure may be adjusted to cause the third signal to reach a first value, e.g., zero. The adjustment may be performed based on the third signal.

In one embodiment, a filter (e.g. low pass filter (LPF)) may be applied to the third signal to produce a filtered third signal, and the adjustment described above may be based on the filtered third signal.

Additionally, or alternatively, feedback (e.g., PID) control may be applied to the third signal to produce a controlled signal. Accordingly, adjusting the position of the sensing structure may be performed based on the controlled signal. The adjustment may or may not include applying a LPF to the third signal.

An audio output signal may be provided based on the third signal. The audio output signal may be the third signal (or a derivative thereof). Alternatively, the output signal may be generated from the controlled signal rather than the unmodified or filtered third signal, e.g., where feedback control is used without an LPF. In either embodiment, the output signal may still depend on the third signal. Therefore, an audio output signal may be based on the feedback control signal, third signal, or a combination of both.

In further embodiments, the first and second signals may be added to produce a total beam signal strength. Accordingly, power provided to the light source may be adjusted based on the total beam signal strength.

BRIEF DESCRIPTION OF THE DRAWINGS

A better understanding of the present invention can be obtained when the following detailed description of the preferred embodiment is considered in conjunction with the following drawings, in which.

Figure 1A:
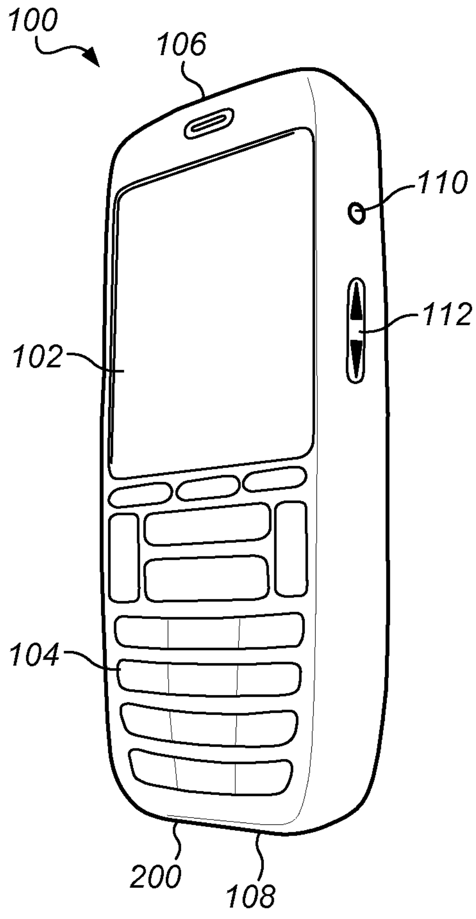
FIGS. 1A and 1B illustrate an exemplary portable device and headset that may include an optical microphone according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation By Reference

The following references are hereby incorporated by reference in their entirety as though fully and completely set forth herein:

U.S. Pat. No. 7,440,117, titled “Highly-sensitive displacement-measuring optical device”, filed Apr. 17, 2006.

U.S. Pat. No. 6,753,969, titled “Microinterferometers With Performance Optimization”, filed Mar. 29, 2002.

U.S. Pat. No. 7,116,430, titled “Highly-Sensitive Displacement-Measuring Optical Device”, filed Nov. 10, 2003.

U.S. Pat. No. 7,485,847, titled “Displacement sensor employing discrete light pulse detection”, filed Dec. 8, 2005.

U.S. Pat. No. 6,643,025, titled “Microinterferometer for distance measurements”, filed Mar. 29, 2002.

U.S. Pat. No. 7,518,737, titled “Displacement-measuring optical device with orifice”, filed Apr. 17, 2006.

N. A. Hall, B. Bicen, M. K. Jeelani, W. Lee, S. Qureshi, M. Okandan, and F. L. Degertekin, “Micromachined microphones with diffraction based optical displacement detection” *Journal of the Acoustical Society of America*, vol. 118, pp. 3000-3009, November 2005.

N. A. Hall, R. Littrell, M. Okandan, B. Bicen, and F. L. Degertekin, “Micromachined optical microphones with low thermal-mechanical noise levels,” *Journal of the Acoustical Society of America*, vol. 122 pp. 2031-2037, October 2007.

U.S. Pat. No. 5,134,276, titled “Noise cancelling circuitry for optical systems with signal dividing and combining means”, filed Oct. 9, 1990.

Hobbs, P. C. D., *Ultrasensitive laser measurements without tears*. Applied Optics, 1997. 36(4): p. 903-920.

Greywall, D. S., *Micromachined optical-interference microphone*. Sensors and Actuators A-Physical, 1999: p. 257-268.

Dustin Carr, “MEMS and Optoelectronics Integration for Physical Sensors,” Society of Experimental Mechanics Meeting, 2007.

Note that the references incorporated by reference above describe exemplary embodiments that can be used with embodiments of the present invention. Additionally, various ones of the references cited above provide alternative embodiments. For example, the Greywall and Carr references provide alternative embodiments to those described in the various patents incorporated above. Thus, embodiments of the invention described herein can be used with any of various systems or techniques, including those described in the above references, as well as others.

Terms

The following is a glossary of terms used in the present application:

Memory Medium—Any of various types of memory devices or storage devices. The term “memory medium” is intended to include an installation medium e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, optical storage, flash memory, etc. The memory medium may comprise other types of memory as well, or combinations thereof In addition, the memory medium may be located in a first device in which the programs are executed, or may be located in a second different device which connects to the first device over a network, such as the Internet. In the latter instance, the second device may provide program instructions or data to the first device for execution or reference. The term “memory medium” may include two or more memory mediums which may reside in different locations, e.g., in different computers that are connected over a network.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as “reconfigurable logic”.

Hardware Configuration Program—a program, e.g., a netlist or bit file, that can be used to program or configure a programmable hardware element.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Portable Device—any of various types of computer systems which are mobile or portable, including laptops, PDAs, mobile or mobile telephones, handheld devices, portable Internet devices, music players, data storage devices, etc. In general, the term "portable device" can be broadly defined to encompass any electronic, computing, and/or telecommunications device (or combination of devices) which is easily transported by a user.

Figure 1B:
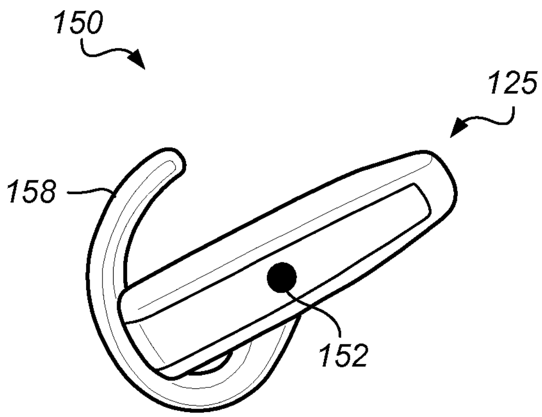

FIGS. 1A and 1B—Exemplary Portable Device and Headset

FIG. 1A illustrates an exemplary portable device 100. The portable device 100 includes a microphone 200, which may correspond to the optical microphone described in various embodiments below. As shown, the portable device also includes a display 102, interface buttons 104, power button 106, docking/charging port 108, audio port 110, and volume controls 112. Note that these elements are exemplary only and that any of these features may be removed or substituted with others as desired. Note further that the shape and type of the portable device 100 is exemplary only. For example, while the current exemplary portable device 100 resembles a PDA or mobile telephone, the portable device 100 may be a portable computer or laptop, among other types of form factors/portable devices. Furthermore, in some embodiments, the interface buttons 104 may be removed or replaced with a single interface button. Additionally, or alternatively, the display may be a touch or multi-touch display which may receive input via the user touching the display, e.g., with fingers, stylus, etc. Furthermore, the portable device may include one or more ports for peripherals, e.g., keyboards, mice, microphones, etc.

It also noted that embodiments of the invention may be implemented in any of various devices, including portable devices and devices intended to be primarily stationary or primarily non-portable (e.g., desktop computer systems, etc.). Embodiments of the invention are described below with respect to exemplary portable device 100.

The portable device 100 may include one or more processors and memory mediums for executing programs and/or operating system(s). The programs stored in the memory medium may be executable to perform functionality of the portable device 100. For example, the portable device 100 may store a program for playing audio files on the portable device, making telephone calls, browsing the Internet, checking email, etc.

FIG. 1B illustrates an exemplary headset 150, e.g., which is usable in conjunction with the portable device 100. Similar to the portable device 100 above, the headset may also include the microphone 200, described in more detail below. Additionally, the headset 150 may be used to receive and/or transmit data (e.g., audio data) from/to the portable device 100, e.g., via a data receiver and/or a data transmitter included in the headset 150. In some embodiments, the headset may be wireless headset, e.g., a Bluetooth® headset, which may transmit and receive the data from the portable device 100 according to various wireless communication protocols (e.g., Bluetooth® communication protocols, among others). As shown, the headset 150 may include one or more interface buttons 152. For example, the headset 150 may include one or more buttons for interacting with functionality of the portable device 100 (e.g., stopping, starting, pausing, fast forwarding, rewinding, etc. music playback, accepting or rejecting a phone call, etc.). Finally, the headset may include a portion 158 for wrapping or holding on to a user's ear.

Thus, the portable device 100 and/or the headset 150 may include the optical microphone 200. Note that while FIGS. 1A and 1B are shown as a particular portable device and accessory, the optical microphone 200 may be included in any type of device, computer system, or accessory (portable or otherwise) which receives audio, such as consumer electronics, recording devices, etc.

Figure 2:
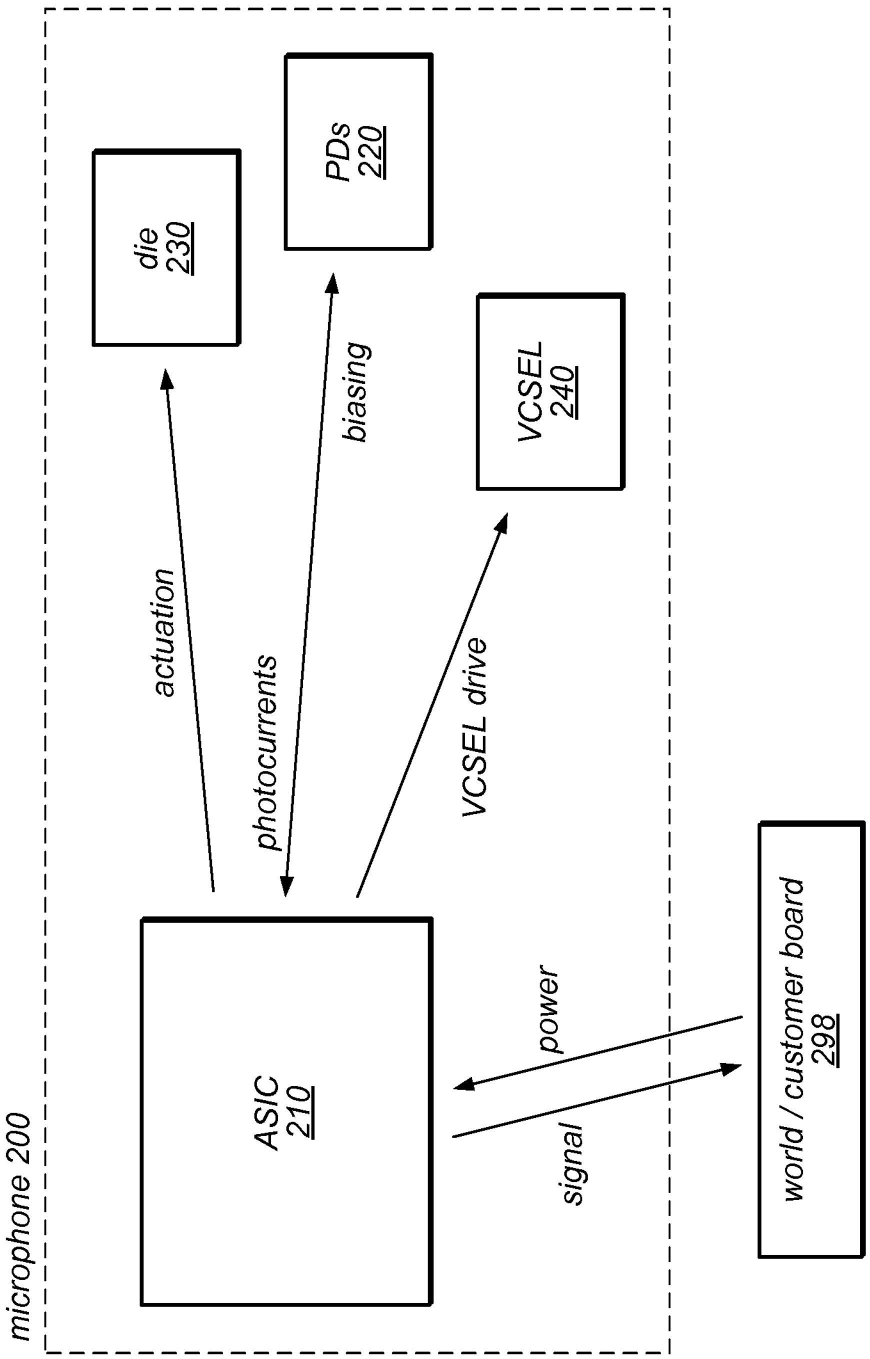
FIG. 2 illustrates a block diagram of the microphone, according to one embodiment.

FIG. 2—Exemplary Block Diagram of the Microphone 200

FIG. 2 illustrates an exemplary block diagram of the microphone 200. As shown in FIG. 2, the microphone 200 may include a circuit 210 (e.g., an ASIC or programmable hardware device, such as a field programmable gate array (FPGA), among other possibilities), one or more photo detectors (PDs) 220, a die 230 (e.g., a MEMS), and a light source 240, such as a VCSEL. Note that, in any of the descriptions herein, the term "VCSEL" may be replaced with any appropriate light source.

As shown, the circuit 210 may be coupled to the outside world, such as a customer board 298. The customer board 298 may provide power to the circuit 210. The circuit 210 may in turn provide power to the VCSEL. The VCSEL may provide laser light to the die 230. The laser light may reflect from a sensing structure of the die 230, and the reflected laser light may be detected by the photo detectors 220. The die 230 may include a diffraction grating, which may operate as described in various ones of the references incorporated above, although other embodiments may be used instead. Accordingly, the photo detectors may provide photo currents back to the circuit 210 in response to the reflected laser light. These photo currents may correspond to acoustic vibrations of the sensing structure of the die 230.

The circuit may then process these photo currents and provide an output signal to the customer board 298. As also shown, the circuit 210 may be configured to provide a reverse bias to the PDs 220 and/or actuation to the die 230. The circuit 210 may be configured to perform any of various functions. For example, the circuit 210 can contain several functional blocks including a steady state VCSEL driver block, a pulsed VCSEL driver block for low power operation, a PD photocurrent to voltage conversion block, a feedback control circuit, a block which is configured for generation of electrostatic actuation signals to the sensing structure, and/or an analog to digital signal conversion block, among other possibilities.

Figure 3:
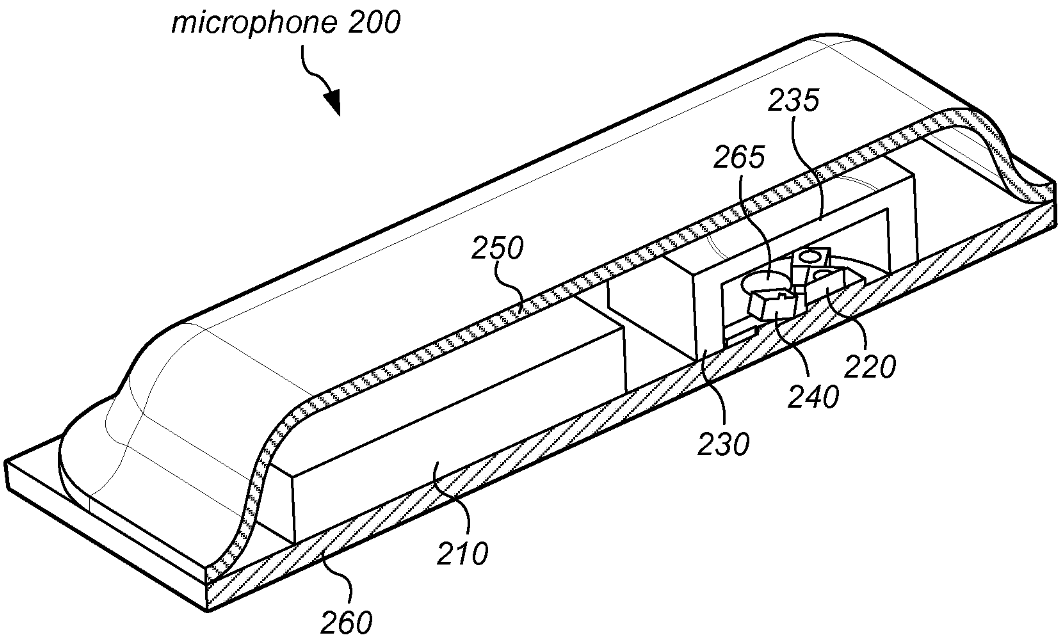
FIG. 3 illustrates a cross section of one embodiment of the microphone.
Figure 4:
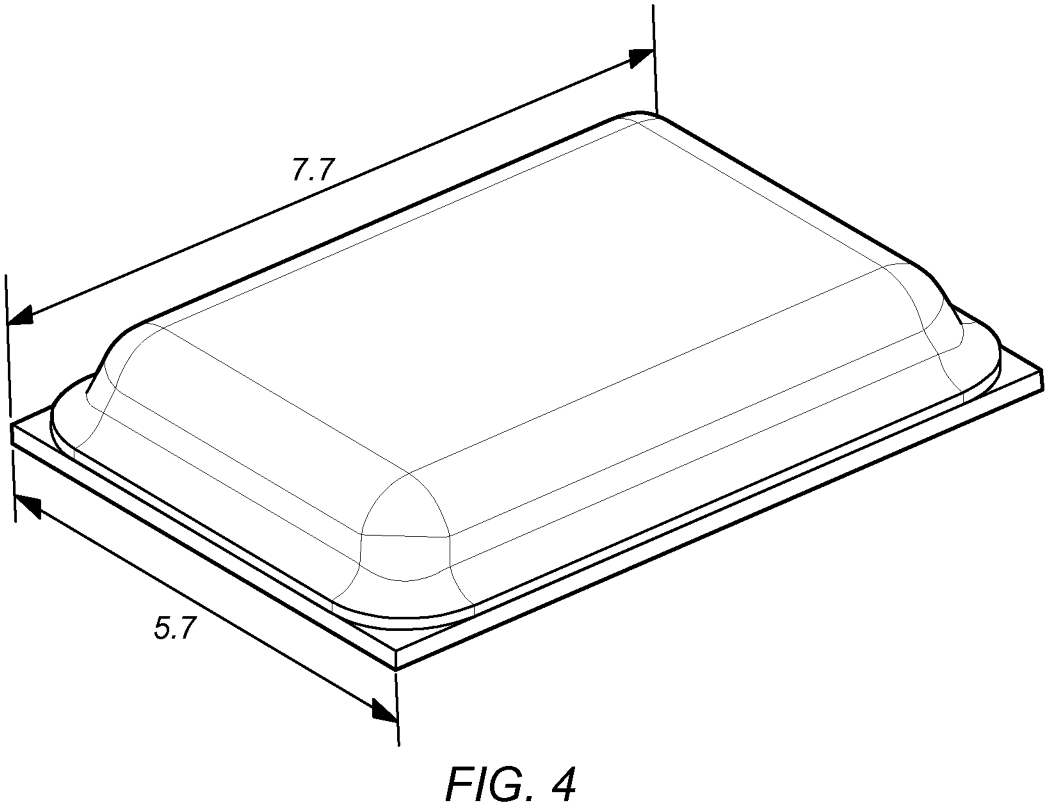
FIG. 4 illustrates the encapsulated microphone, according to one embodiment.

FIGS. 3 and 4—Exemplary Cross Section and Package of the Microphone 200

FIG. 3 illustrates an exemplary embodiment of the microphone 200. In particular, FIG. 3 illustrates the construction of a complete packaged microphone capsule that enables realization of a commerciality viable product.

In this particular embodiment, the microphone 200 includes an ASIC (corresponding to circuit 210), the MEMS die (corresponding to die 230), and optoelectronics mounted to a common substrate capable of routing electrical signals between the MEMS 230, the ASIC 210, the photo detectors 220, the VCSEL 240, and one or more devices external to the package (298). Thus, in one embodiment, all four objects or dies may be mounted to common substrate 260, such as a PCB. As shown, a lid 250 covers the top of the system.

Additionally, acoustic entry ports 265 are placed in the first substrate 260 (e.g., the PCB) located beneath the MEMS die 230. The acoustic entry ports 265 may be formed by hole(s) or via(s) in the substrate 260. As shown, these port(s) are placed within the perimeter of the footprint of die 230. Note that a single hole or several small holes can be used to form the acoustic entry port(s). The acoustic entry ports may be covered with a thin membrane material, such as mylar or parylene (among other possibilities). Such a membrane can server to keep out dust and dirt. It can also serve to protect the microphone from bulk air flow originating from wind or human speech.

The cavity (e.g., the Bosch cavity) directly beneath the MEMS sensing structure 235 and possible grating enables compact integration of the VCSEL 240 and photo detectors 220. The grating of the MEMS die may allow the photo detectors 220 to efficiently detect the vibrations of the sensing structure 235. As shown, the Bosch cavity can be made large enough to contain the VCSEL 240 and photo detectors 220. In one embodiment, traces on the PCB 260 may be used to route signals between the optoelectronics (VCSEL 240 and photo detectors 220) and the ASIC 210. In one particular embodiment, these traces may run underneath the MEMS die 230. This configuration enables the entire package to be approximately 1 mm thick or less. Alternatively, or additionally, the signals between the circuit 210 and the die 230 may be routed through wirebonds directly between the two die. Signals between the ASIC 210 and outside world 298 may be routed through the substrate 260 to create a surface mount package.

As shown in both FIGS. 3 and 4, the package may be completed with a protective lid 250. The protective lid or cap 250 may create a sealed air volume which may be necessary for an omni directional microphone. In one embodiment, one or more additional acoustic entry ports (e.g., in the form of holes) may be fabricated on the lid to enable sound to reach both the front and the back of the structure 235 of die 230. Such embodiments may result in a "figure 8" or other type of directional microphone and may be particularly applicable to a cellular phone system configuration in which the cellular phone casing or exterior contains a two-hole configuration to accommodate the "figure 8" or other directional microphone. Accordingly, the directional microphone may be placed inside the cellular phone, and in between the holes on the cellular phone exterior. Similar to embodiments above, these acoustic ports may also be covered by a thin membrane material.

As shown in FIG. 4, the overall package configuration described above may be approximately 7.7 mm×5.7 mm. Actual dimensions, however, can be adjusted and capsules as small as 2 mm×2 mm×1 mm should be feasible. Note that these sizes are exemplary only and other sizes are envisioned.

Figure 5A:
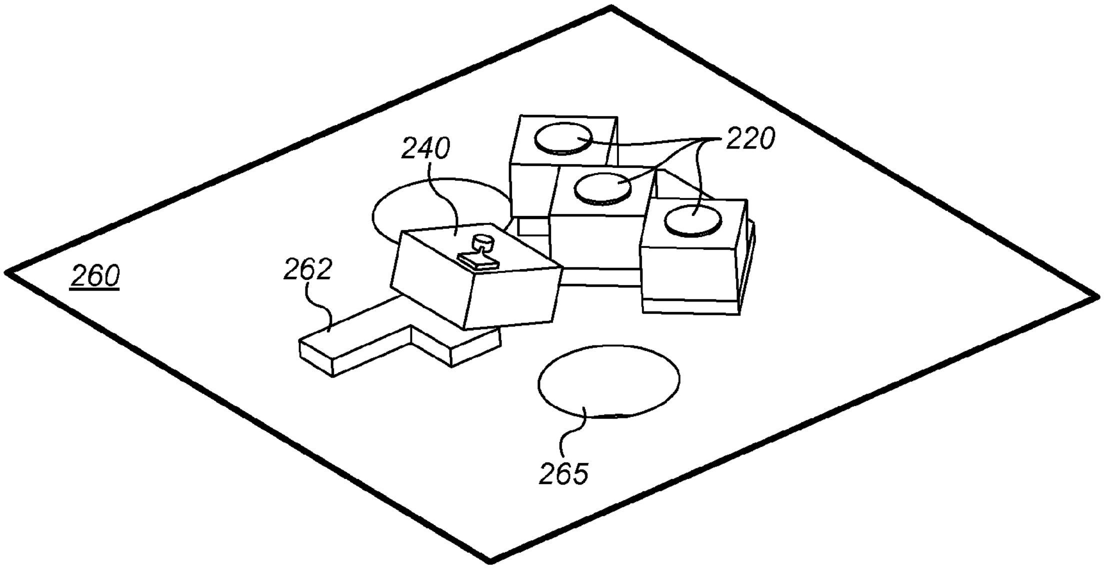
FIGS. 5A and 5B illustrate two different embodiments for tilting the VCSEL beam.
Figure 5B:
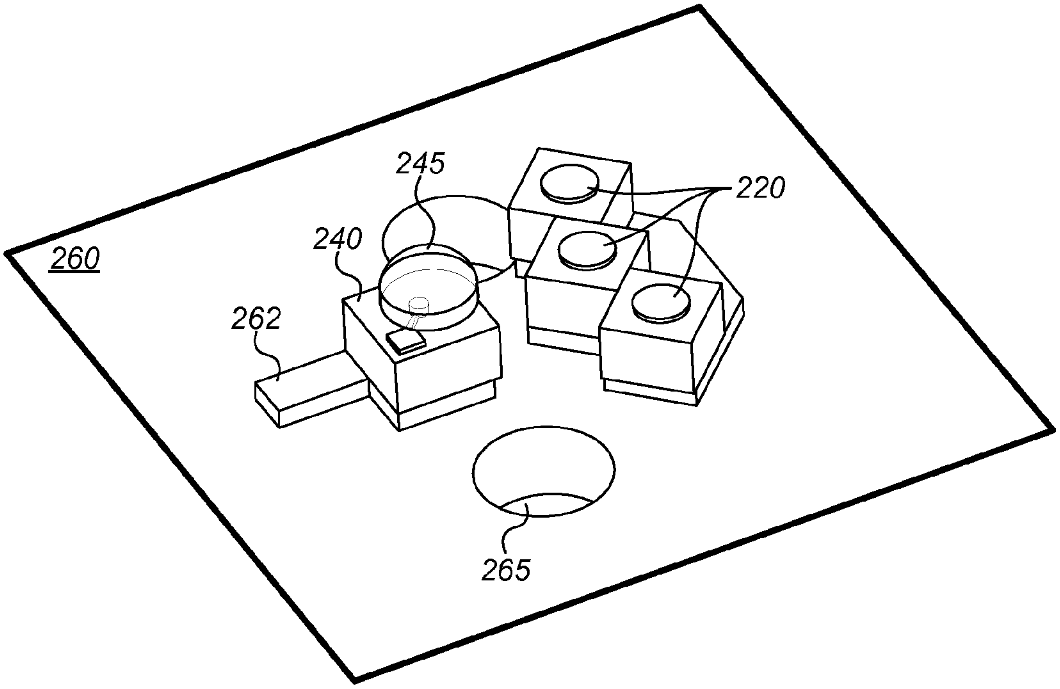

FIGS. 5A and 5B—Tilted VCSEL

In some embodiments, the VCSEL 240 may be tilted. For example, tilting the VCSEL beam may be advantageous so that the laser light reflected from the sensing structure 235 of the die 230 is directed onto the plane of the PD array 220. FIGS. 5A and 5B illustrate the portion of the first substrate 260 within the cavity beneath the die 230. In the embodiments of FIGS. 5A and 5B, the photo detectors 220 are embodied as a photodiode array which may be implemented as discrete die, an array fabricated on a common chip and distinct from the substrate 260, or an array fabricated on the substrate 260. The latter may be preferred for high volume manufacture.

In FIG. 5A, the VCSEL 240 may be tilted using features 262 fabricated directly onto the first substrate 260. The tilt necessary for correct pointing of the VCSEL is accomplished by using the relative height difference of the metal (e.g., copper) traces 262 and the common substrate 260. At high volume, a vacuum chuck holding the VCSEL can be combined with vision recognition systems to accurately place the VCSEL 240 as illustrated in FIG. 5A.

Alternatively, in the embodiment of FIG. 5B, the VCSEL 240 is mounted flat and an off axis optical element (e.g. refractive lens) 245 is used to steer the VCSEL laser light. Thus, as shown, a lens 245 offset from the primary optical axis of the VCSEL 240 can also be used for beam pointing. Note that, in this embodiment, the VCSEL 240 may still be mounted on feature 262, or may be mounted directly on the substrate 260. Similarly, the photo detectors 220 may be mounted on features or directly on the substrate 260.

Figure 6A:
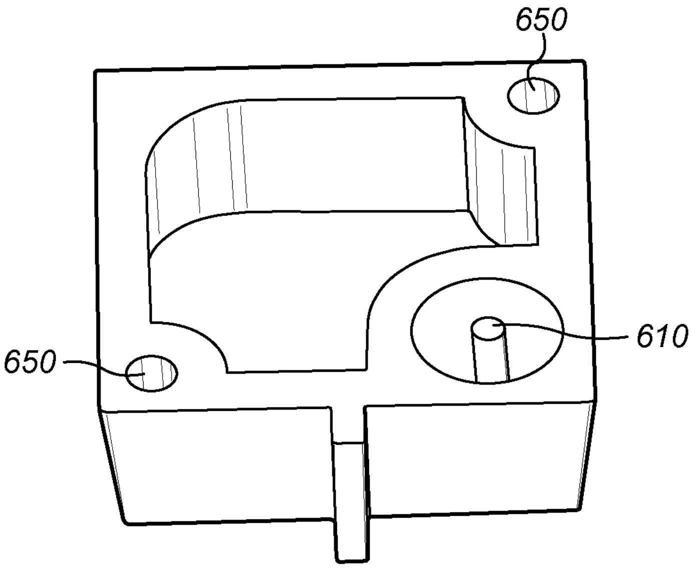
FIGS. 6A and 6B illustrate the MEMS die with alignment features, according to one embodiment.
Figure 6B:
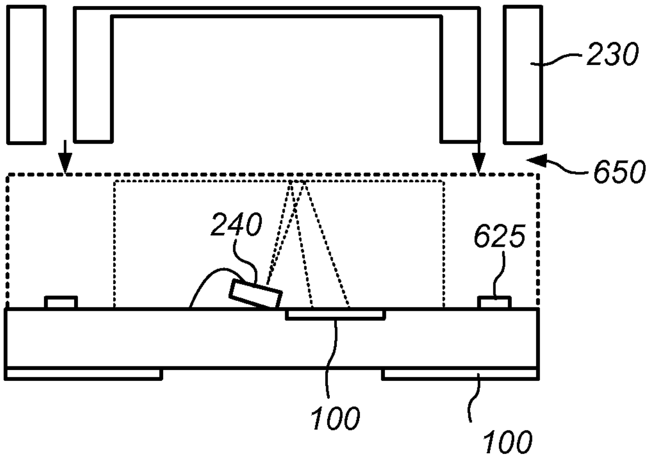

FIGS. 6A and 6B—Alignment Features for the Microphone 200

In one embodiment, the grating (e.g., which is part of the die 230) must be aligned with respect to the incident VCSEL beam with an accuracy of approximately 10 μm. FIGS. 6A and 6B illustrate an embodiment where alignment features are used to achieve such an alignment. More specifically, alignment features 650 may be patterned directly into the corners of the die 230, e.g., with a Bosch process, and can assist with this alignment. Corresponding mating solder features 625 may be included on the substrate 260. Where the die 230 is stacked on the circuit 210 (as described below), these features may be fabricated on the circuit (e.g., the CMOS ASIC).

In one embodiment, a coarse assembly may place the parts together, and then the solder may be reflowed to form a permanent mechanical and electrical connection. Upon solder reflow, the surface tension forces of the molten solder tend to align features on the ASIC with those on the MEMS die. This technique can be used instead of or in conjunction with industry standard vision recognition techniques for die placement.

FIG. 6A presents images of the die 230 from the backside illustrating the mechanical alignment holes 650. As also shown, the die 230 includes a through silicon via (TSV) 610, described in more detail below. FIG. 6B illustrates a schematic of the self alignment embodiment.

FIGS. 7A-9—Further Embodiments of the Microphone 200

The following figures and descriptions correspond to alternative embodiments where circuit 210 and die 230 may be vertically aligned or stacked. Additionally, various ones of the photo detectors 220 and the VCSEL 240 may be integrated into the circuit 210.

Figure 7A:
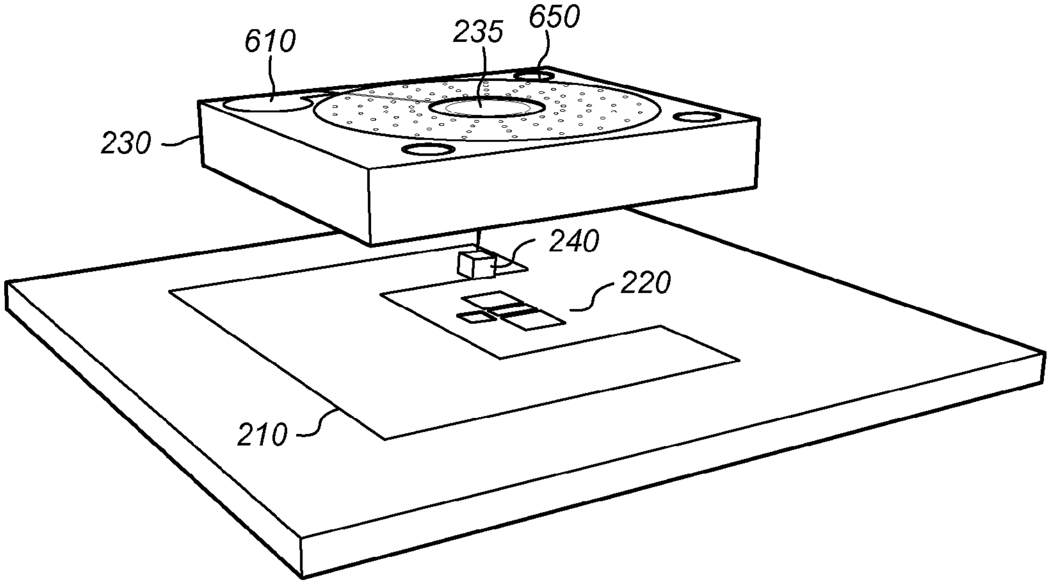
FIGS. 7A, 7B, 8, and 9 illustrate various views of the MEMS die and circuit vertically aligned with various different integrated features, according to some embodiments.
Figure 7B:
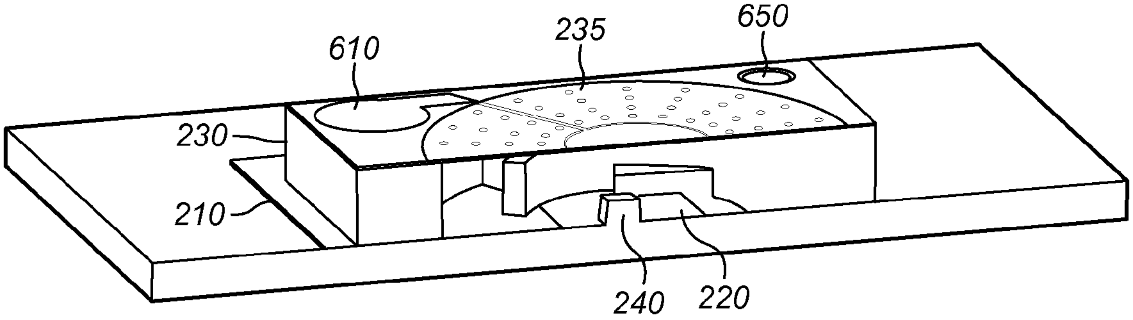

FIGS. 7A and 7B illustrate an exploded and collapsed view of an embodiment where the die 230 is stacked on the circuit 210. Additionally, the photo detectors 220 are integrated into the circuit 210. More specifically, in one particular embodiment, a chip, such as a CMOS chip, may include both the circuit 210 electronics and the PD array 220. In one embodiment, they may both be fabricated in parallel using a CMOS process. Both the VCSEL 240 and die 230 may be mounted directly to the CMOS chip.

The VCSEL 240 may still reside inside of the Bosch or deep reactive ion etched (DRIE) cavity of the die 230. In one embodiment, the circuit (e.g., the CMOS chip) may include a pad for mounting the VCSEL 240, which may be electrically conductive and serve as the cathode for the VCSEL connection. Additionally, a wirebond may be made between the circuit 210 and the VCSEL 240 for the anode. Additionally, a tilted VCSEL configuration described above can be implemented. In one embodiment, rather than using traces on a PCB, the tilting may be accomplished using topography on the CMOS chip, e.g., which contains several surface micromachined layers that can be manipulated for this purpose. The lensed VCSEL steering technique described above is also an option with this embodiment.

Further, when vertically aligned, a through silicon via (TSV) 610 can be used for routing signals between the circuit 210 and the die 230. These signals enable electrostatic actuation of the sensing structure 235. Simultaneous structure actuation and displacement detection may enable several unique features, such as self-test, self-calibration, and closed loop force feedback operation. Rather than making electrical connection to the structure with an external wirebond, the TSV may enable the signal to be routed through an isolated VIA fabricated in parallel with the die 230. However, in further embodiments, the circuit 210 may have dimensions that extend beyond that of the die 230 and wirebonds may be used between the die 230 and the circuit 210 for signal routing.

In summary, the alignment and via features described above have the advantage of accomplishing 1) physical alignment, 2) securing the two die in place, and 3) making electrical connection between die all in the same assembly step.

These embodiments may present many benefits. For example, monolithic integration of photo detectors 220 and the allied readout circuitry in a standard CMOS process may eliminate the need for separate additional PD components and external detection electronics. Additionally, the semiconductor laser, detectors, readout electronics, and modulating element may be integrated into 1 $mm^3$ volume or less. Furthermore, use of TSV(s) may allow for fewer wirebonds and reduced part count. For example, only one wirebond may be required inside the cavity (e.g., the wirebond to the anode of the VCSEL 240). According to the embodiments shown in 7A and 7B, the part count is further reduced since the photo detectors 220 are integrated with the circuit 210.

However, it should be noted that TSVs may be used when the circuit 210 and the die 230 are not vertically aligned, e.g., by using traces underneath the substrate 260.

Figure 8:
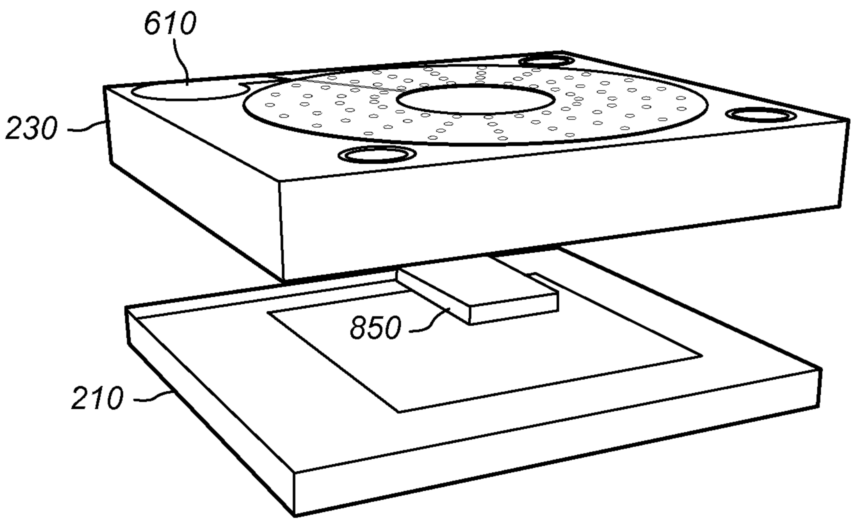
Figure 9:
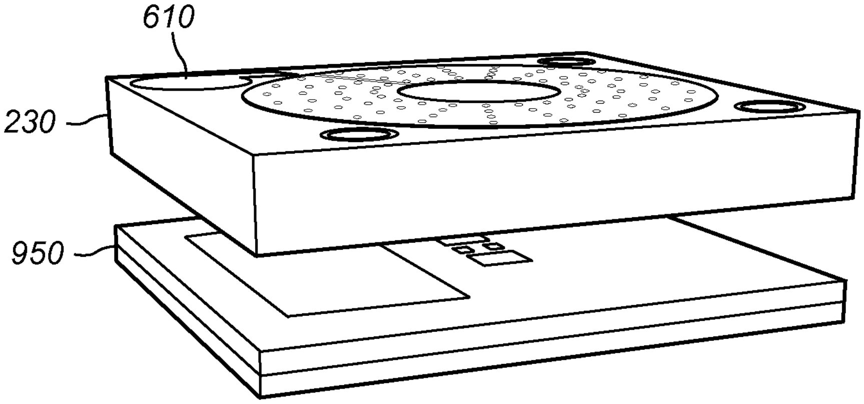

A further embodiment is illustrated in FIG. 8. This design is similar to FIGS. 7A and 7B described above; however, in this embodiment, the photo detectors may be fabricated on the same die as the VCSEL 240. Accordingly, the VCSEL and photo detectors die 850 may be placed within the cavity of the die 230. Both the die 230 and VCSEL die 850 are mounted directly to the circuit 210. A TSV 610 on the die 230 can be used for routing signals between the die 230 and the circuit 210. Alternatively, the dimensions of the circuit 210 can extend beyond that of the die 230 and wire bonding can be used to route the signals. Signal routing between the VCSEL die 850 and circuit 210 can be accomplished with wirebonds.

A final embodiment is presented in which the die 230 is mounted directly above a second die 950 containing the circuit 210, the VCSEL 240, and the photo detectors 220.

Thus, FIGS. 7A-9 illustrate various embodiments where the die 230 is vertically aligned or stacked with the circuit 210 and/or various ones of the VCSEL 240, the photo detectors 220, and the circuit 210 are integrated into common dies. Note that as used herein, when a die is coupled to a substrate (e.g., the die 230 to the substrate 260), it may be directly or indirectly attached to the substrate. For example, the die 230 may be directly attached to the substrate 260 or may be attached to the circuit 210, which is in turn attached to the substrate 260. Additionally, in further embodiments, the substrate 260 may not be required, and various ones of the components may be mounted directly on the circuit 210, e.g., the lid 250, the die 230, the photo detectors 220, and/or the VCSEL 240.

Figure 10:
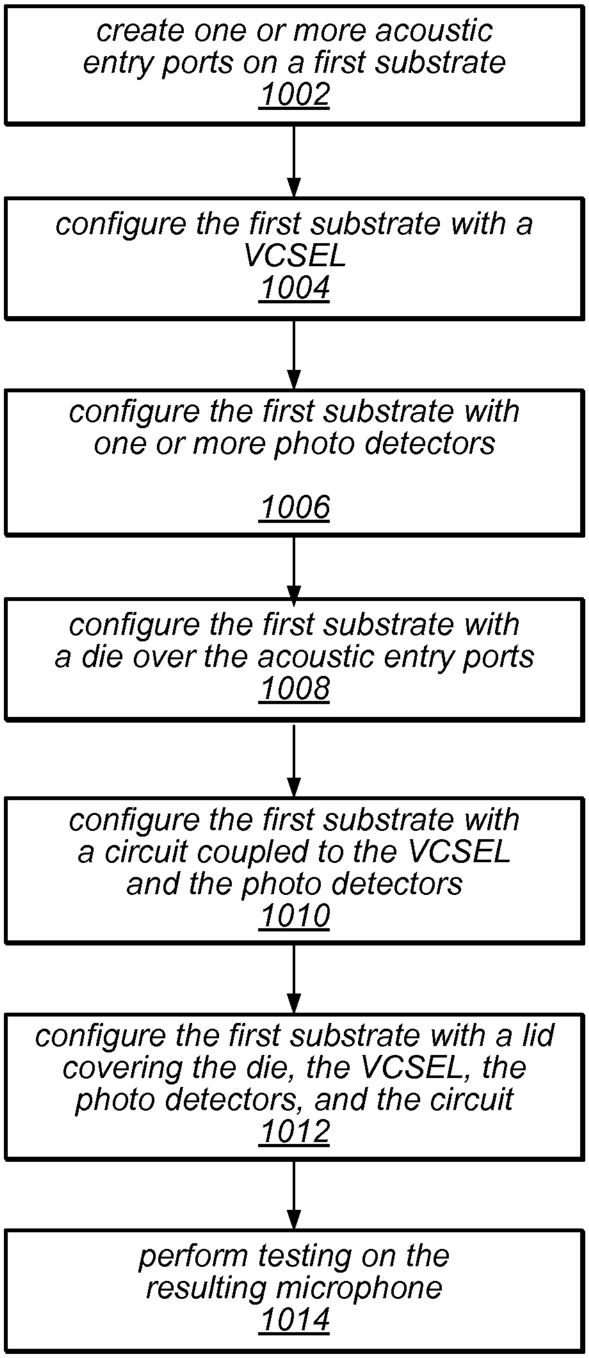
FIG. 10 is a flowchart diagram illustrating one embodiment of a method for manufacturing the microphone.

FIG. 10—Method for Manufacturing the Microphone 200

FIG. 10 illustrates an exemplary method for manufacturing the microphone 200. The method shown in FIG. 10 may be used in conjunction with any of the systems or devices shown in the above Figures, among other devices. In various embodiments, some of the method elements shown may be performed concurrently, performed in a different order than shown, or omitted. Additional method elements may also be performed as desired. As shown, this method may operate as follows.

In 1002, one or more acoustic entry ports (e.g., acoustic entry ports 265) may be created on a first substrate. The first substrate may be configured to route electronic signals. For example, the first substrate may be a PCB, although other substrates are envisioned. However, it should be noted that in some embodiments, acoustic entry ports may not be required.

In 1004, the first substrate may be configured with a light source (e.g., the VCSEL 240). As indicated above, the light source may be configured to generate laser light, e.g., in order to measure acoustic vibrations of the sensing structure.

In 1006, the first substrate may be configured with one or more photo detectors (e.g., photo detectors 220). As indicated above, the one or more photo detectors may be configured to receive the laser light after reflection from the sensing structure to measure the acoustic vibrations of the sensing structure.

In 1008, the first substrate may be configured with a die (e.g., the die 230) over the one or more acoustic entry ports, the light source, and the one or more photo detectors. As described above, the die may include a sensing structure and grating, which may be used to measure acoustic waves received via the acoustic entry ports (or others). The die may form a first cavity between the first substrate and the sensing structure, and the light source and photo detectors may be comprised within the first cavity. In some embodiments, in order to place the die in the desired position on the first substrate, electronic signals may be used to apply actuation forces to the sensing structure. Based on feedback from signals from the photo detectors, the die may be positioned. For example, the die may be positioned such that the modulation of the reflected signals is at a maximum, such that a zero crossing is obtained between the first and second beam signals, etc.

In 1010, the first substrate may be configured with a circuit, such as the circuit 210. The circuit may be attached to the first substrate and may be electrically coupled to the VCSEL, MEMS die, and the photo detector(s). The circuit may be configured to receive signals from the photo detector(s) and/or provide audio signals based on the received signals. Additionally, the circuit may be configured to receive power from an external source and provide at least a portion of the power to the light source to generate the laser light. However, such functionality may be performed by a separate power circuit or functional block, as desired.

In 1012, the first substrate may be configured with a lid which covers the first substrate to create a microphone. The lid and the first substrate may then form a system cavity (as shown in FIG. 3), where the die, the light source, the photo detector(s) and the circuit are included within the system cavity.

Note that the steps described in 1004-1012 may result in any of the configurations shown and described above. For example, the die and the circuit may be vertically aligned or not, depending on the embodiment (e.g., See FIGS. 3, 7A, 7B, 8, 9 for various configurations). Thus, the steps described above are not limited to any one embodiment of the systems described above, but may result in any of those embodiments, among other possible variations.

In 1014, testing may be performed on the resulting microphone. For example, in one embodiment, a final step in the manufacture of the microphone may be rapid testing of completed parts and screening of bad components.

In one embodiment, the microphone may be configured with an additional pin. For example, the first substrate may be configured with the pin, e.g., on the bottom surface of the PCB, which may lead to the electrostatic actuation terminal of the structure. A broadband voltage signal (e.g. swept sine, chirp, white noise, or impulse) may be applied to the terminal to apply electrostatic actuation forces to the sensing structure. The resulting signal may be monitored and devices screened accordingly. Additionally, or alternatively, the microphone may be tested using an acoustic source as an external stimulus. For example, a known stimulus may be applied, and the audio signals received from the circuit may be compared against a known, good response to the known stimulus. Acoustic testing may be especially desirable since it also tests whether or not sound has entered the acoustic port(s).

FIGS. 11-23B—Illustrative Figures Corresponding to the Method of FIG. 10

FIGS. 11-23B are illustrative figures that correspond to one particular embodiment of the method of FIG. 10. More particularly, these Figures provide exemplary schematics and particular processes which may be used for manufacturing the microphone 200. Note, however, that these Figures are exemplary only and are not the only envisioned embodiments for manufacturing the microphone 200. In other words, further variations are covered by the method of FIG. 10.

Figure 11:
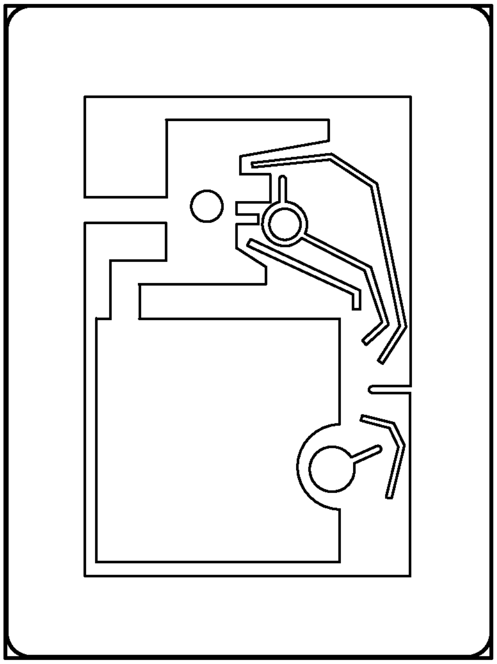
FIGS. 11-23B are illustrative figures corresponding to one embodiment of the method of FIG. 10.

FIG. 11 illustrates one embodiment of the substrate 260 of the microphone 200. This is a schematic of a PCB with 8 mil (200 μm) thickness. Electrical traces are shown. In this embodiment, panelized FR4, 0.5 oz copper, and an immersion gold finish may be used.

Figure 12:
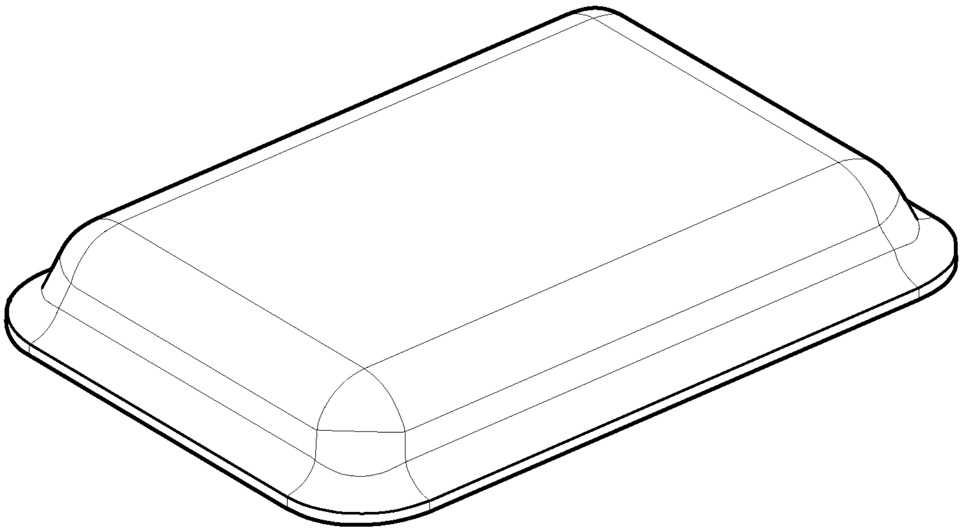

FIG. 12 illustrates the cap or lid which may cover the PCB of FIG. 11. The cap may be comprised of 5 mil 304 stainless steel and may have a ~8×5×1 mm footprint, although other sizes and materials are envisioned.

Figure 13:
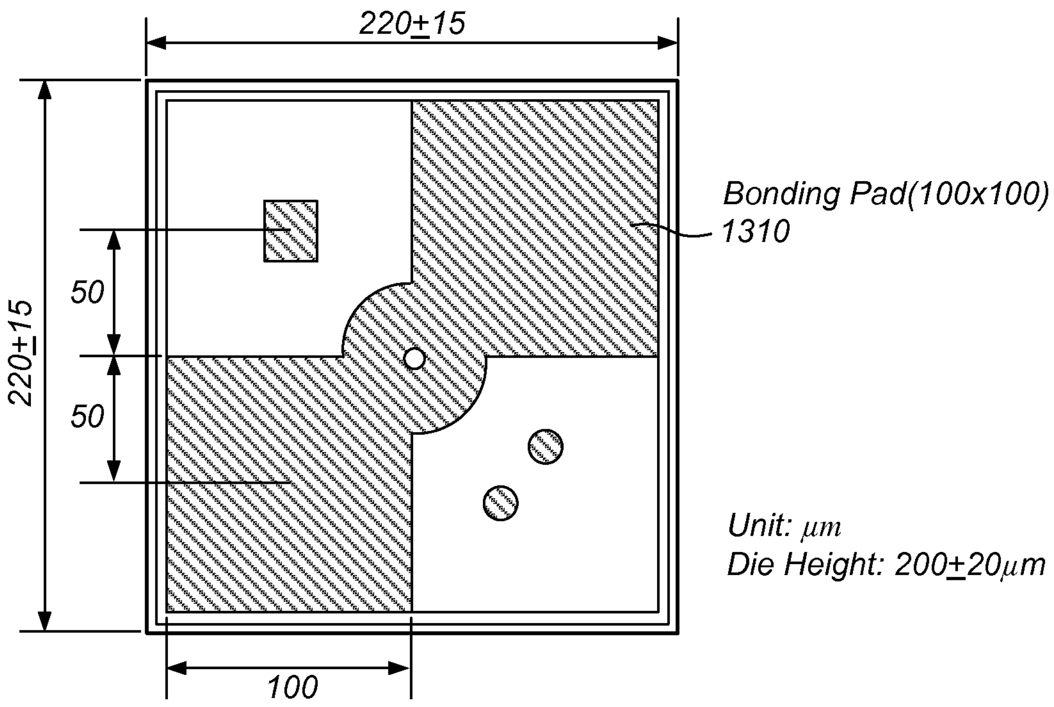

FIG. 13 illustrates a schematic of a commercially available VCSEL. The die may be approximately 200×200 μm. The bonding pad 1310 of the VCSEL may be 100×100 μm.

Figure 14:
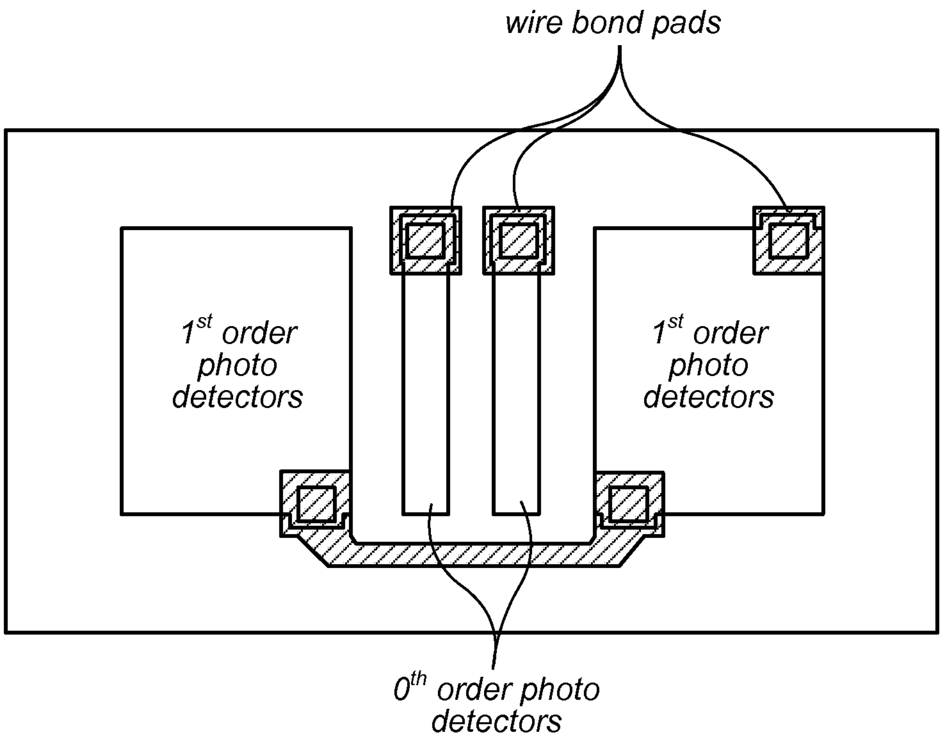

FIG. 14 illustrates a schematic of a photodiode array, which is shown as 355×610 μm. As shown, the photodiode array may include two $1^{st}$ order photo detectors and two $0^{th}$ order photo detectors. The two $1^{st}$ order photo detectors may be wired together on the substrate. Additionally, as shown there are a plurality of wire bond pads.

Figure 15A:
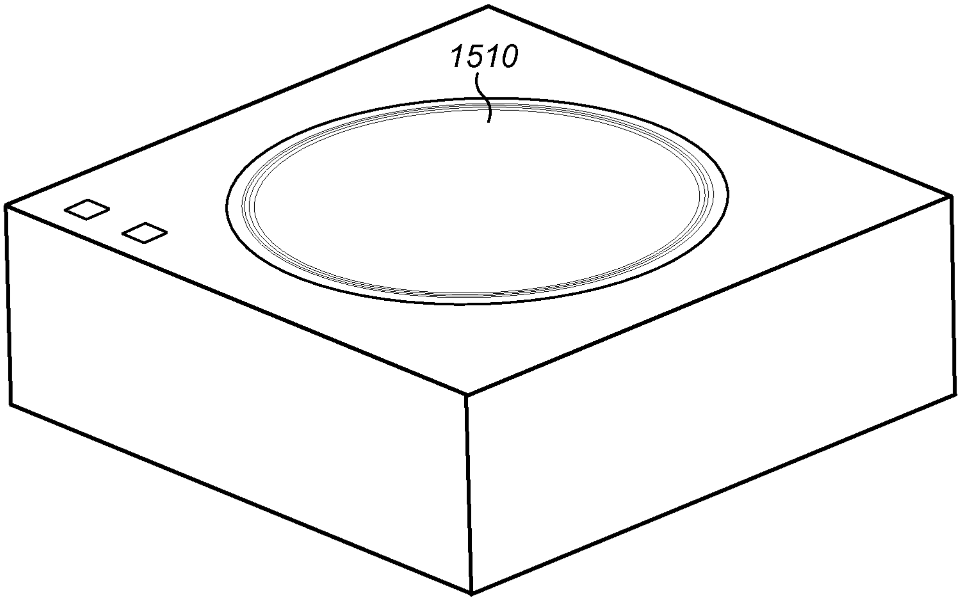
Figure 15B:
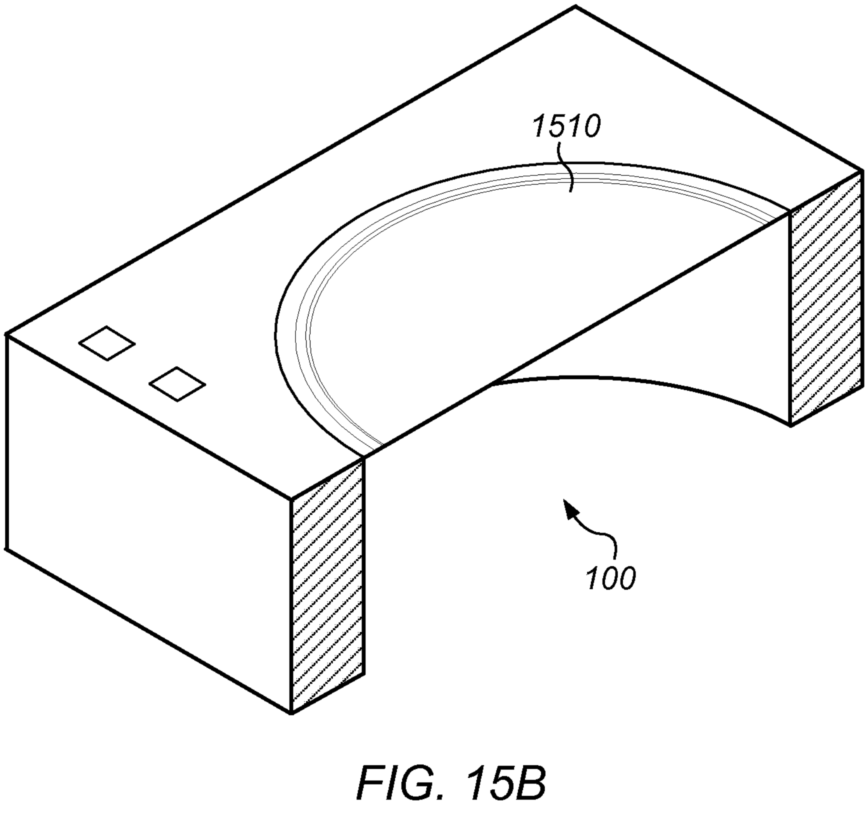

FIGS. 15A and 15B illustrate three dimensional representations of the MEMS die. In this particular embodiment, the die may have a 2 mm×2 mm×0.65 mm dimension. As shown, the die may include a delicate surface micromachined diaphragm 1510. The die may also include a through silicon wafer etch on the backside 100.

Figure 16:
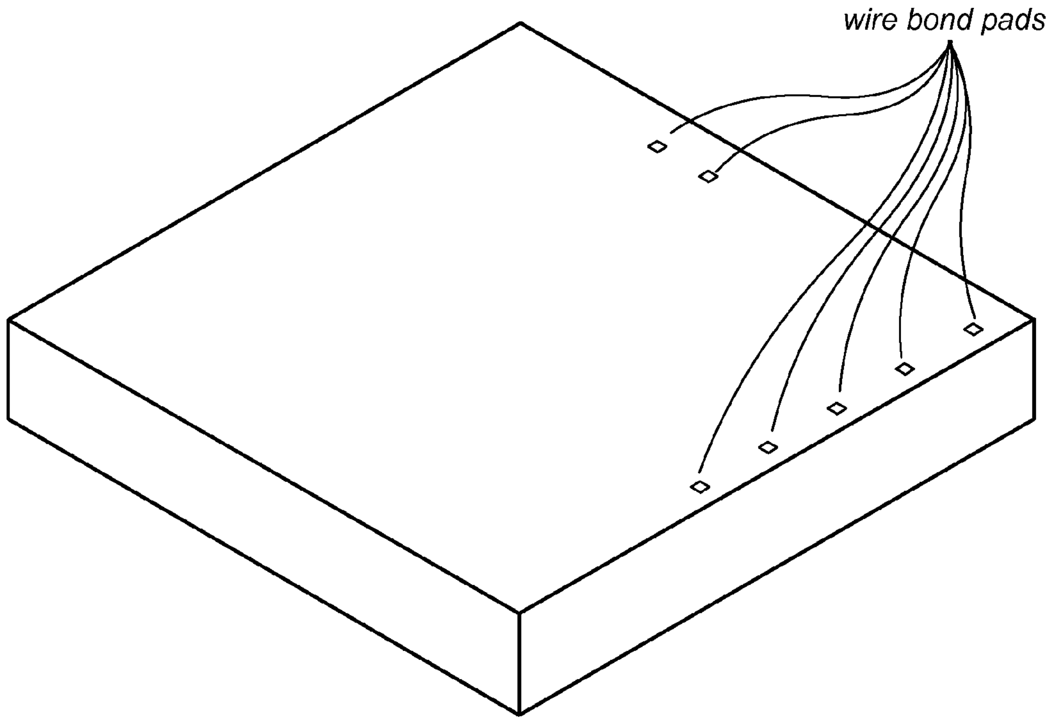

FIG. 16 illustrates one embodiment of the circuit component (e.g., an ASIC). In this embodiment, the circuit may have a 3×3×0.5 mm footprint. Wire bondpads near the edge of the ASIC are labeled.

Figure 17:
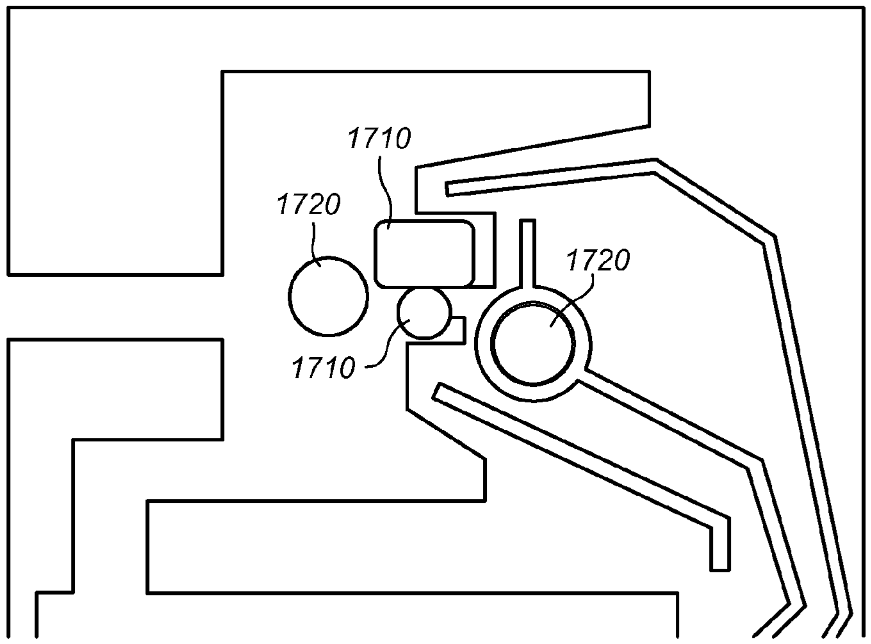

FIG. 17 illustrates a first step of attachment to the first substrate. In this particular embodiment, epoxy may be placed in sections 1710, next to acoustic inlet ports (e.g., PCB vias) 1720.

Figure 18A:
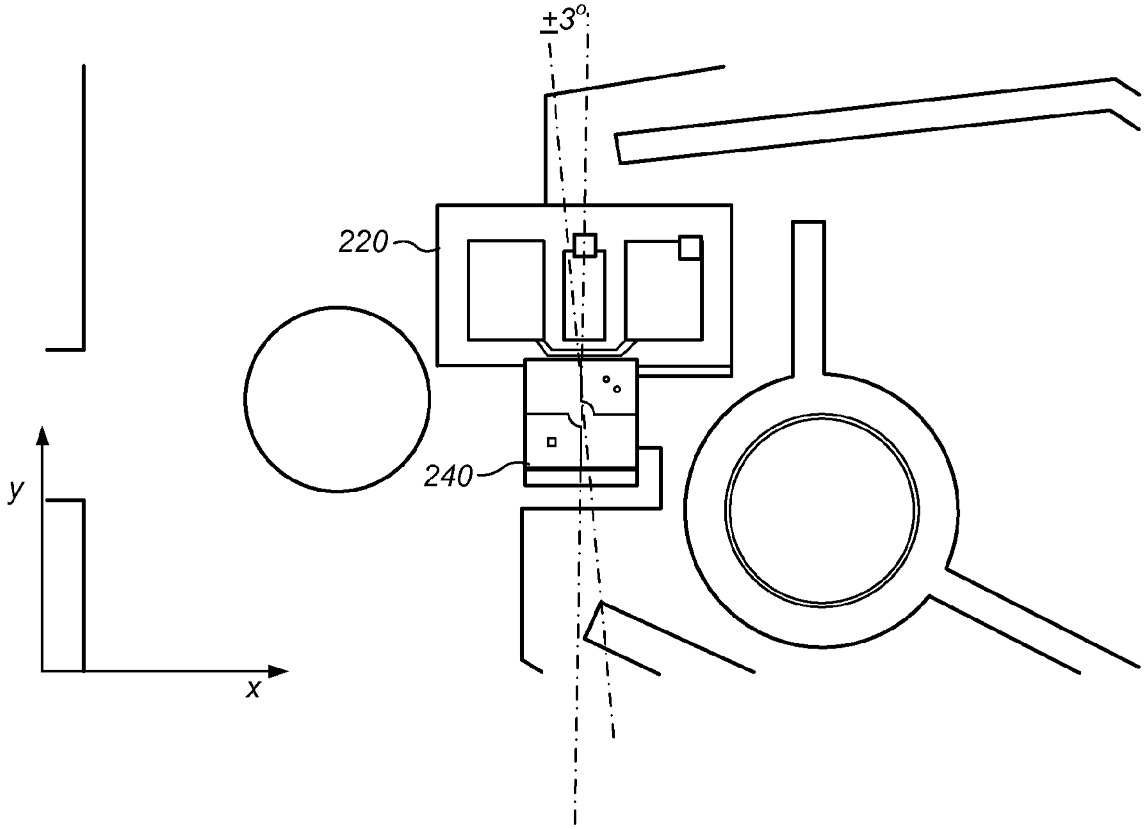
Figure 18B:
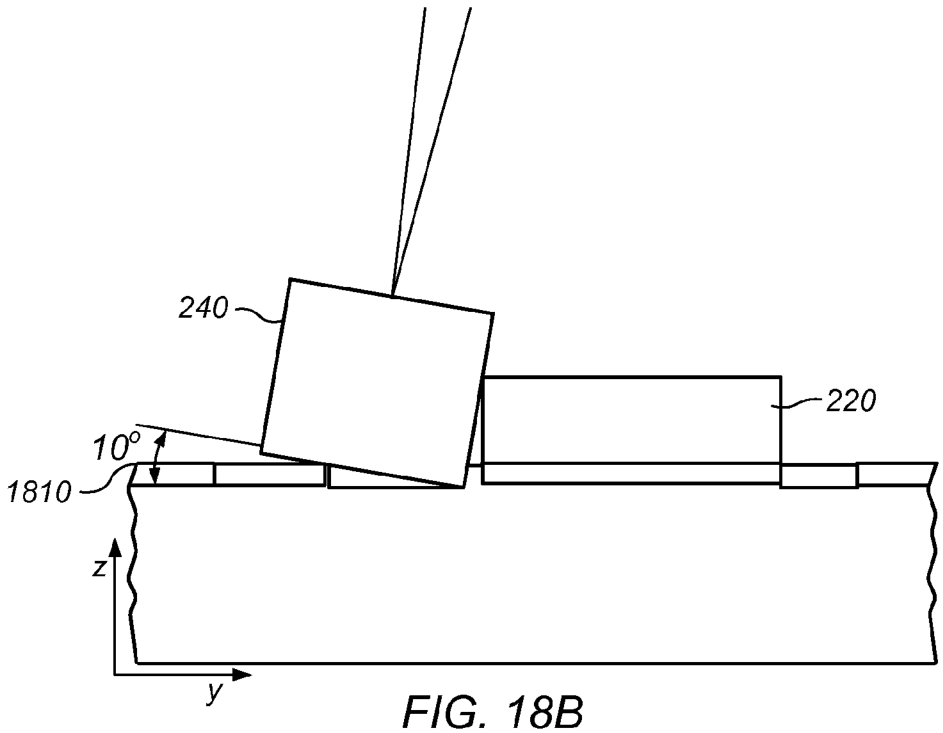

FIGS. 18A and 18B illustrate different views of a second step of manufacture. In this embodiment, the photodiode array 220 may be placed first (e.g., aligned to PCB trace+/−10 μm, +/−3 degrees about z-axis). Next, the VCSEL 240 may be aligned to photodiode center element (+/−5 μm in x-axis), with a VCSEL/photodiode separation of less than 10 μm in y-axis. Additionally, the VCSEL may be tilted by 10 degrees (+/−2 degrees about x-axis) via a PCB trace 1810. Additionally, the VCSEL tilt may be less than +/−2 degrees about the y-axis.

Figure 19:
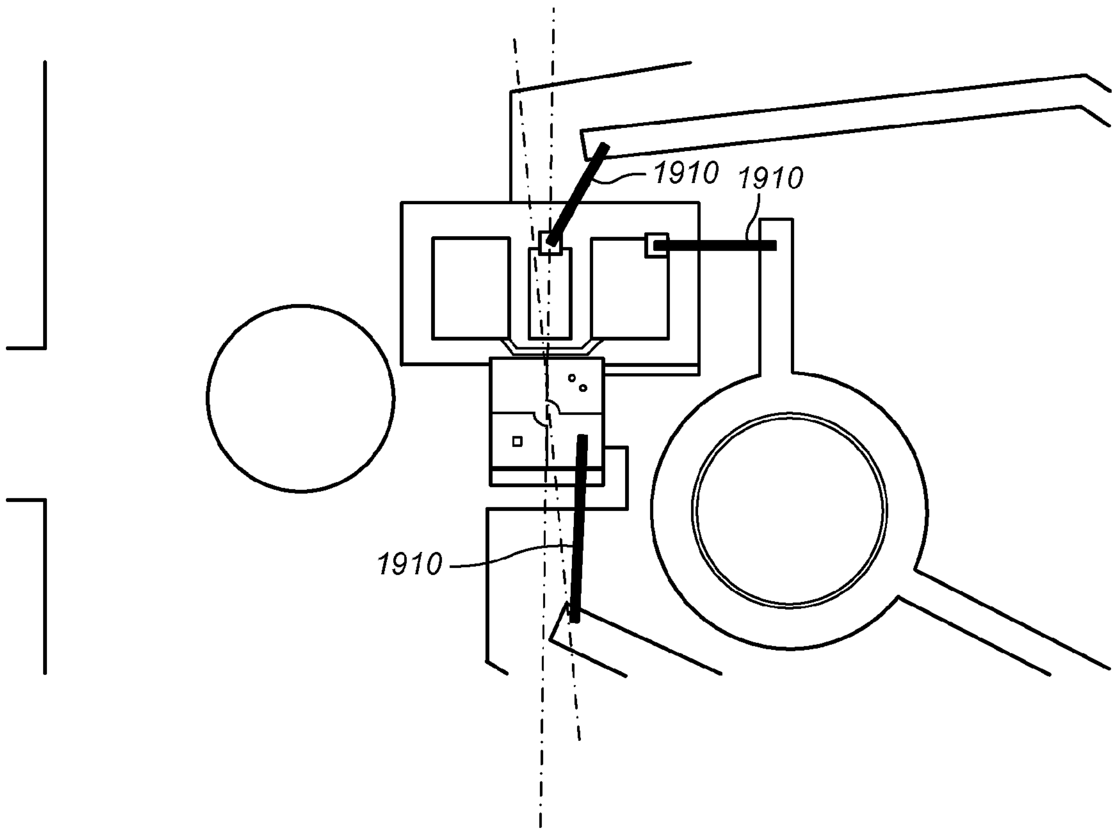

FIG. 19 illustrates a third step of manufacture. More specifically, FIG. 19 illustrates a cure and wire bond process. The cure may be performed at 150 degrees Celsius for five minutes. The wire bonds 1910 may be performed using gold wire. In some embodiments, ball bonding may be preferred to accommodate VCSEL tilt.

Figure 20:
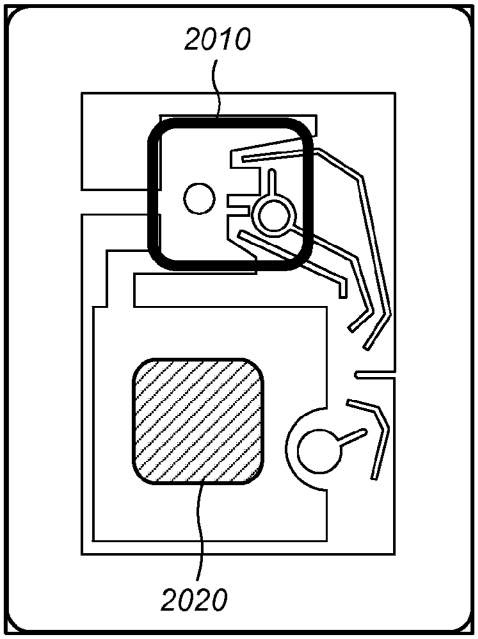

FIG. 20 illustrates a fourth step of manufacture. More specifically, FIG. 20 illustrates a process for attaching the MEMS die and the circuit die. The MEMS die 230 may be attached by applying conductive epoxy to the perimeter of MEMS die outline 2010 for MEMS die attachment and acoustic sealing. A silkscreen or solder mask layer may protect the traces and may reduce the risk of shorting due to excess seepage. Additionally, conductive epoxy may be applied to the portion 2020 for circuit die attachment.

Figure 21:
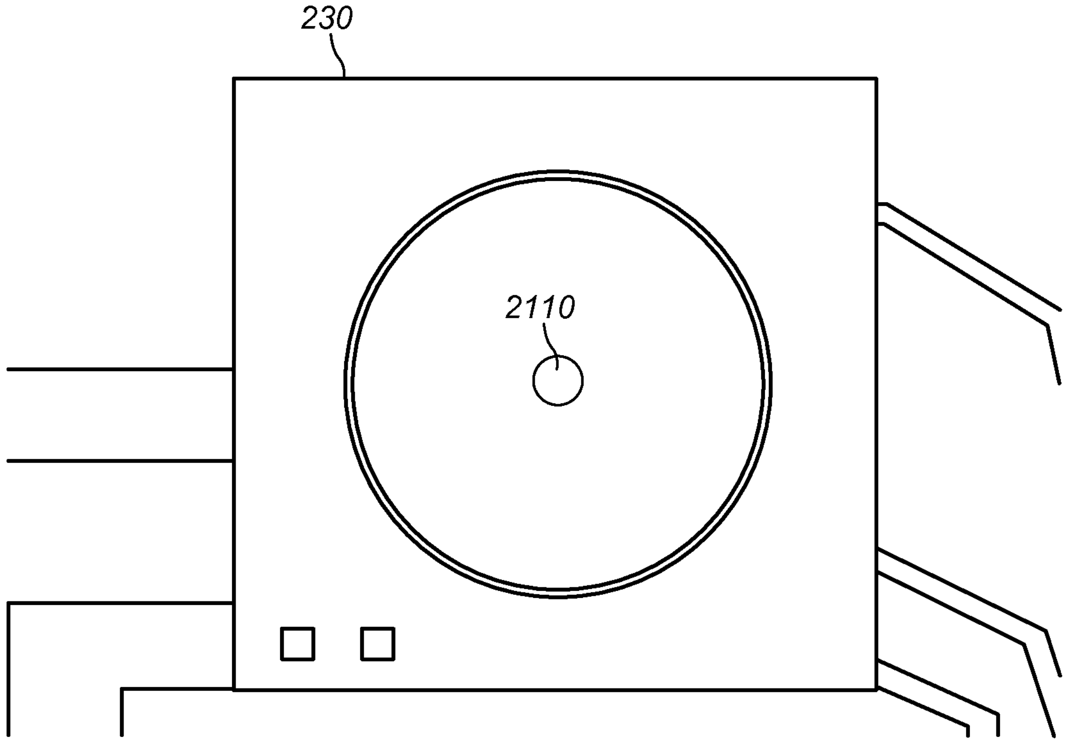

FIG. 21 illustrates a fifth step of manufacture where the MEMS die 230 is attached. In this attachment, features on the MEMS die 230 may be used to align the MEMS die 230 to the VCSEL (at location 2110) with +/−10 μm accuracy, and the MEMS tilt may be less than 2 degrees about the z-axis. The MEMS die may be cured at 150 degrees Celsius for five minutes.

Figure 22:
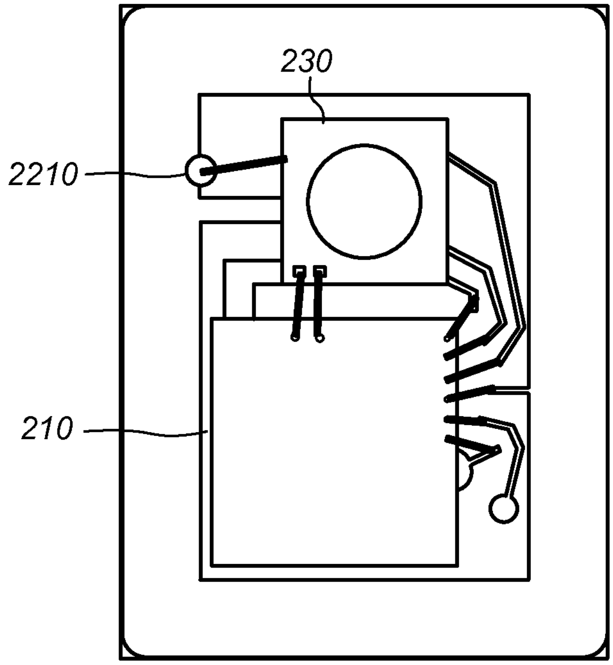

FIG. 22 illustrates a sixth step of manufacture where the assembly is cured and wire bonded. Similar to above, the cure may be performed at 150 degrees Celsius for five minutes and the wirebonding performed using gold wire bonding. The optional electrostatic access 2210 may require an additional wire bond to bypass the circuit 210. After, the lid may be attached and cured, possibly in the same step as the MEMS die attachment, depending on MEMS die drift. The lid may be attached using various methods (e.g., which provide electrical connection), such as solder reflow.

Figure 23A:
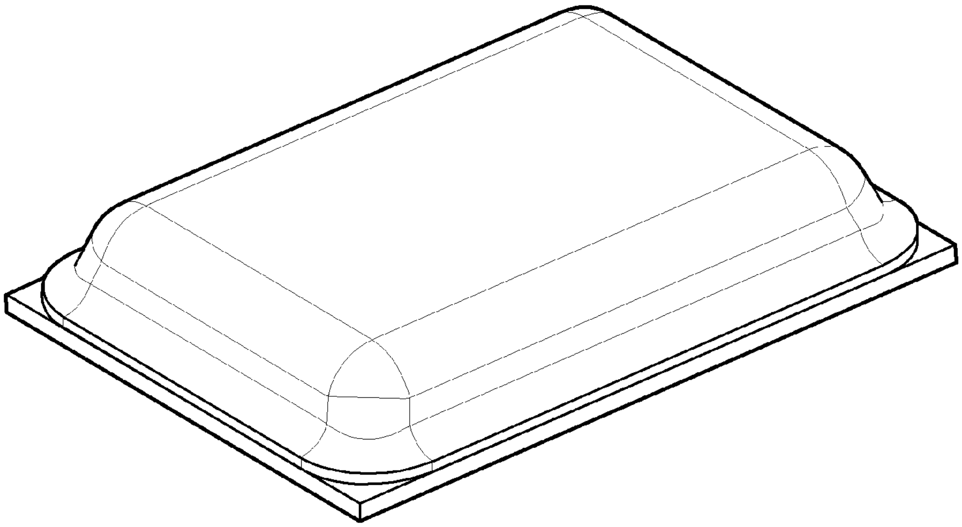
Figure 23B:
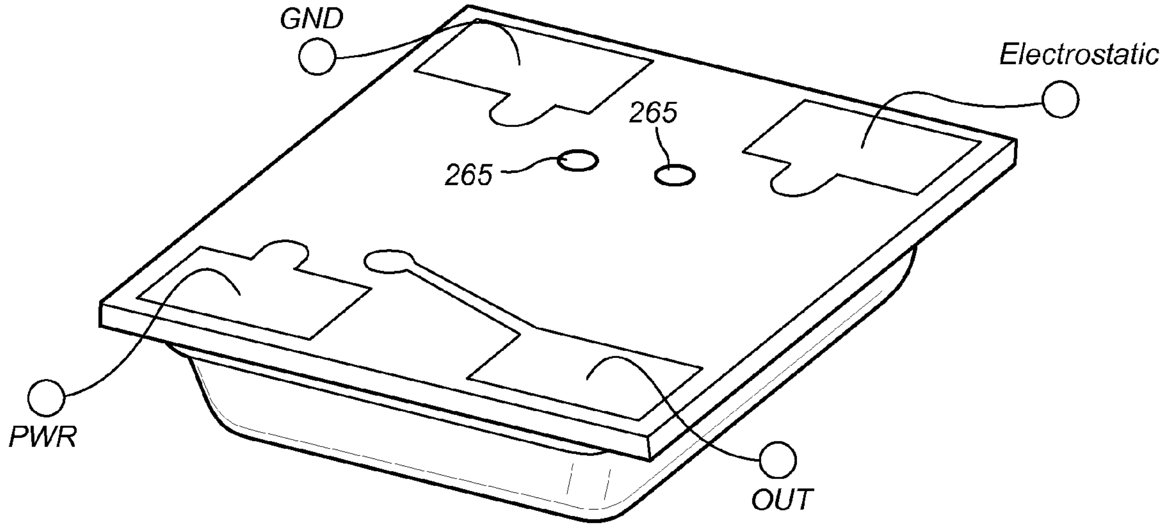

FIGS. 23A and 23B provide top and bottom views of the sealed microphone. In FIG. 23B, various electrical contacts are shown, including power, ground, out (for audio signals), and electrostatic input, described above. It should be noted that it may be important that chip singulation not introduce moisture or debris through backside acoustic ports 265, e.g., by attaching a membrane to these ports.

The final system may be characterized via various methods. In one embodiment, the system may be tested by applying a calibration signal acoustically, e.g., via an "acoustic chuck". In one embodiment, a three pin probe may be applied on the backside (for ground, power, and output) and a known acoustic signal may be applied for stimulus response testing.

In some embodiments, the microphone may be tested using electrostatic or piezoelectric actuation. For example, a fourth probe may be added for electronic actuation access using the input shown in FIG. 23B. This may be usable for verification of dynamics, circuit operation, optical performance, and/or calibration of each individual microphone which may include trimming circuit parameters.

Signal Processing

Figure 24:
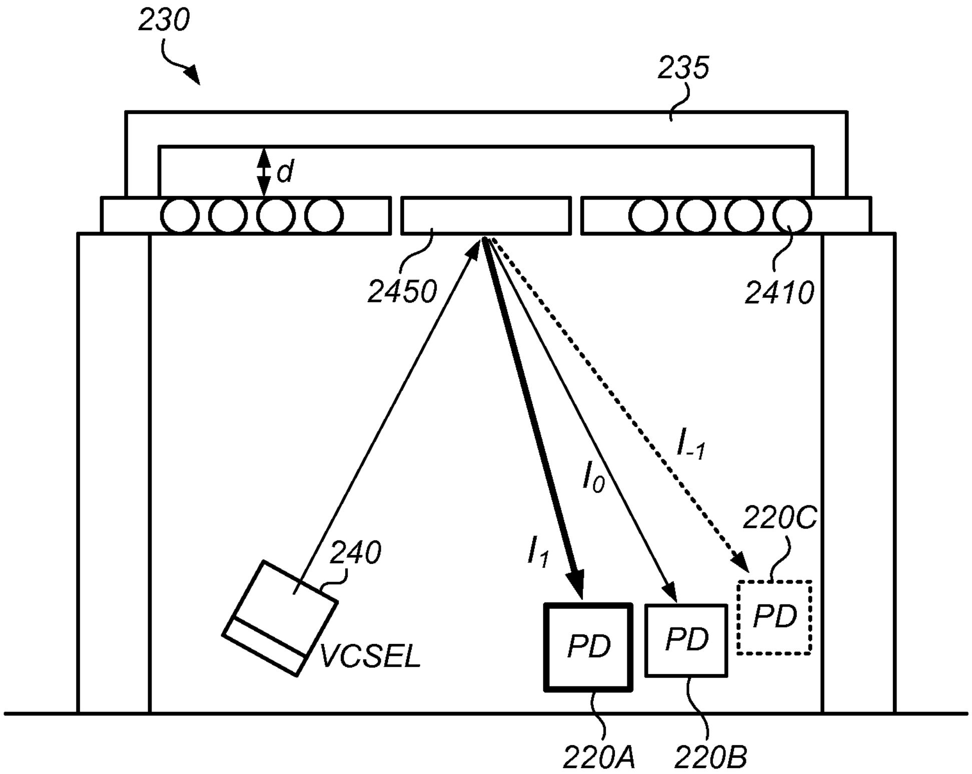
FIGS. 24-30 are illustrative figures corresponding to various embodiments for processing signals from a microphone.

As described above, in one embodiment, the microphone 200 may include the die (e.g., a MEMS device) 230, the VCSEL 240, one or more photo detectors 220, and a circuit (e.g., an ASIC) 210. As already described, the optical interference signal produced by the die 230 interacting with the VCSEL light is collected by the photo detectors 220. FIG. 24 illustrates one embodiment of the die 230 of the system, which may be applicable to the descriptions below, although other alternatives are envisioned. As shown, the VCSEL 240 and three photo detectors 220A, 220B, and 220C may be within the cavity formed by the die 230. The die 230 may also include sensing structure 235 as well as grating 2450 and air holes 2410. As shown, the VCSEL 240 may emit laser light which reflects (and diffracts) from the grating 2450. The resulting reflection $I_0$ may be received by photo detector 220B. The diffractions $I_1$ and $I_{-1}$ may be received by photo detectors 220A and 220C respectively.

The signals provided by the photo detectors may be converted and output in a format (e.g., an audio format) that is acceptable to a device or user receiving the signal. Processing the signals to produce an output with sufficiently low noise (e.g., laser intensity noise, relative intensity noise (RIN), or excess noise) may require calibration of the die 230, as described below. However, it should be noted that while the embodiments below are described with respect to optical microphones using diffraction, these embodiments may also apply to optical microphones that do not use diffraction, such as in the Carr reference incorporated by reference above.

Figure 25A:
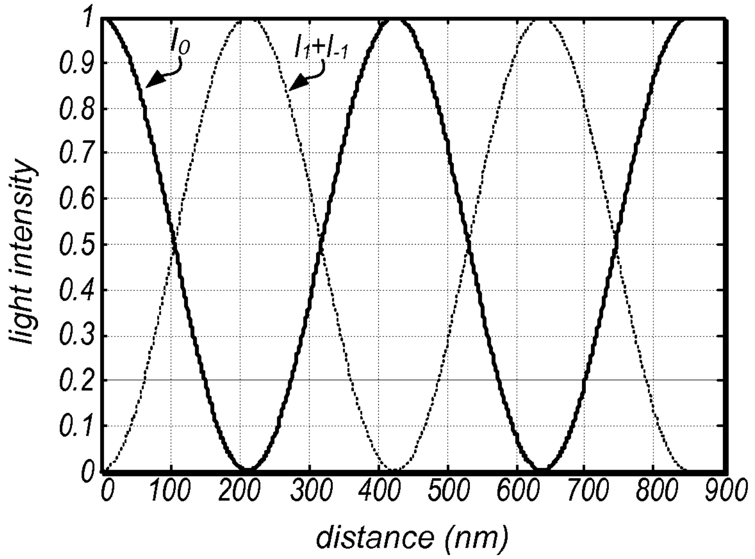

In one embodiment, such as shown in FIG. 24, at least two beams (i.e., a physical beam of light or laser light) are generated. In some embodiments, signals based on these beams ("beam signals") may be complementary, such as $I_0$ and $(I_1+I_{-1})$ (graphed in FIG. 25A). A beam signal may refer to an electrical signal (e.g., current or voltage) in proportion to beam intensity, e.g., as measured with a photo detector. Complementary beam signals may refer to a system of beams where one beam signal strength increases with forward movement of a modulating element (e.g., the sensing structure 235) while the other beam signal strength decreases with forward movement of the modulating element.

Figure 25B:
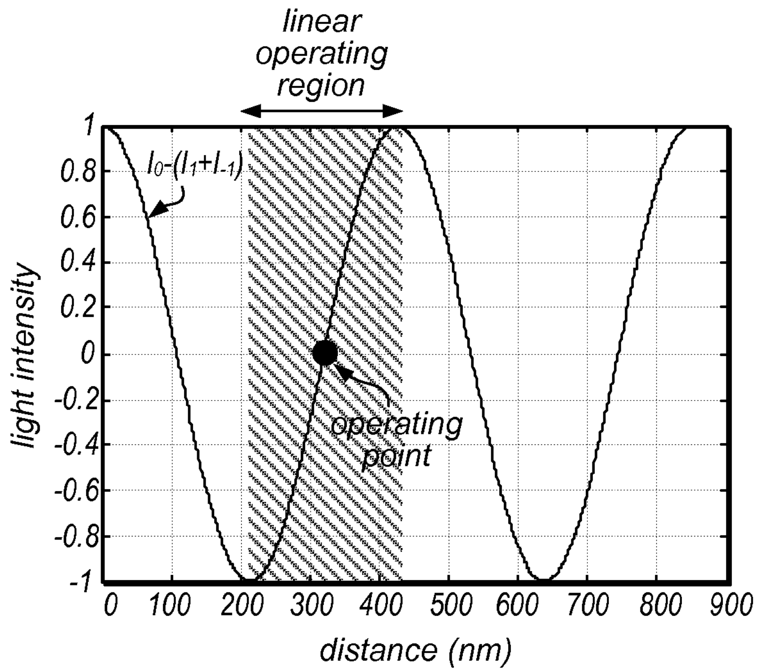
Figure 26:
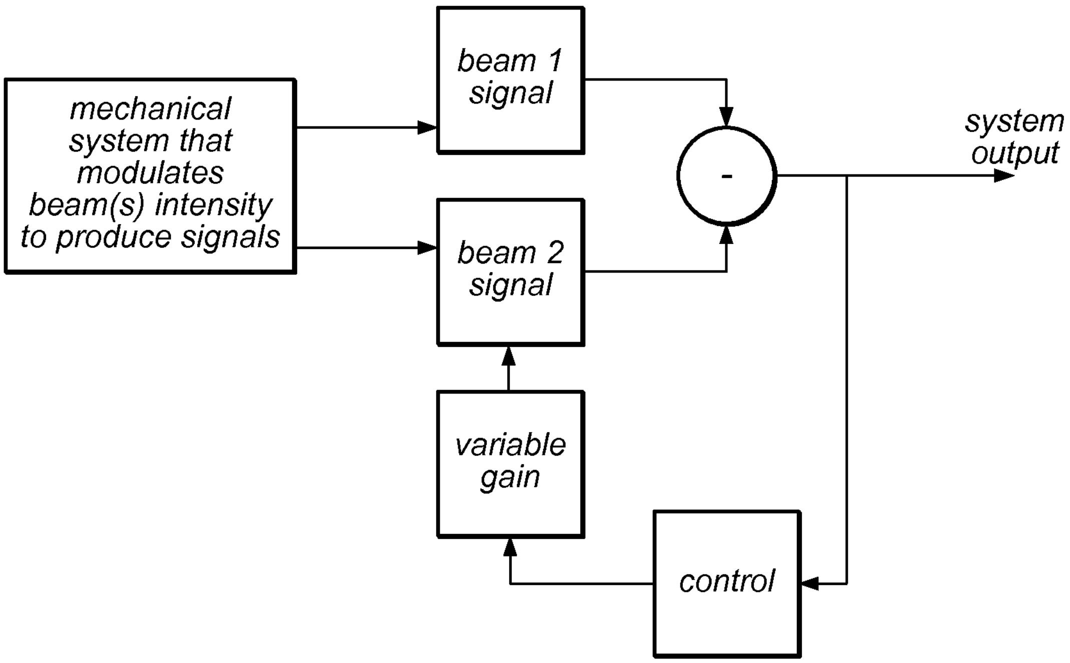

The signal strength of these beam signals may be subtracted (shown in FIG. 25B). The success of this scheme in cancelling RIN from the system may be dependent on how well the strengths of the beam signals are matched prior to the subtraction process. In one particular embodiment, equalization of beam signal strength may be accomplished entirely in the electrical domain (e.g., using electrical circuits). In such an embodiment, a circuit may be employed which executes the following tasks: a) the subtraction of the two signals is performed and b) a feedback circuit is used to adjust the amplitude of one of the input beams so that the result of the subtraction is zero. Note that a non-zero result upon subtraction may be considered an error signal which may be used to scale the amplitude of one of the signals to force the error signal to zero. FIG. 26 provides a block diagram corresponding to such an embodiment. More particularly, as shown, a mechanical system that modulates beam(s) intensity may produce signals, resulting in at least a first and second beam signal. These two beam signals may be subtracted. Additionally, the output of the subtraction may be monitored via a controller, which may be coupled to a variable gain block controlling the gain of the second beam signal. As described above, the gain may be adjusted to force the subtraction signal to zero or remove error. The control electronics may be designed to force the error signal to zero only below a certain frequency (e.g. 20 Hz), while frequencies higher than said frequency pass to system output. Note that the beam signals may not be the physical beams themselves, but rather the current or voltage signal that represents the beam after passing through light intensity sensors (e.g., photo detectors). Additionally, note that the block diagram of FIG. 26 (as well as the block diagrams described below) may be implemented as digital circuits or analog circuits (e.g., in an integrated circuit or on a printed circuit board, among other possibilities).

Alternatively or in addition to the variable gain adjustment described in FIG. 26, calibration may include tuning the set point of the system (e.g., automatically, via the circuit) and also cancelling any intensity noise inherent in the laser. More particularly, in one embodiment, the circuit may automatically tune (e.g., "autotune") the physical position of the sensor (e.g., the sensing structure) such that the signal output has a large linear range (shown in FIG. 25B) and the laser intensity noise is cancelled. Note that such calibration may be performed prior to use and/or during use, as described below.

In these embodiments, the error signal after subtraction may be used to control the mechanical motion of a modulating element, e.g., the sensing structure 235. The displacement of the sensing structure 235, in turn, may alter the intensity of the beam(s) in the system. A block diagram illustrating this embodiment is presented in FIG. 27. As shown, the sensing structure's motion modulates the beam(s)' intensity. Signals of these two beams are subtracted, and the resulting output is used as system output and also used in a feedback loop. However, it should be noted that signals of beam 1 may refer to signals of a single beam (e.g., an inner beam corresponding to $I_0$) and signals of beam 2 may refer to signals of one or more beams (e.g., outer beams corresponding to $I_1$ and $I_{-1}$). Taking the difference of these signals may remove any DC offset and laser intensity noise as well since this noise is the same in both the $1^{st}$ order and $0^{th}$ order diffraction intensities. However, the signals of beam 1 and beam 2 may not be specific to a reflected/diffracted scheme, and may both be zero order reflection beams.

In the feedback loop, the output signal from the subtraction is provided to a low pass filter, whose output is provided to a control circuit. However, it should be noted that the low pass filter, in this embodiment, is optional. Further, other types of circuits that allow for the frequency filtering described below may be used instead of a low pass filter. In some embodiments, the control circuit may control a variable gain for beam 2 signal and may provide a signal to actuator electronics (e.g., which may buffer or condition the signal provided by the control circuit), which may be used to move the position of the sensing structure. For example, in one particular embodiment, the control circuit may adjust the variable gain on beam 2 signal only periodically (e.g. upon system startup) to ensure the DC values of beam 1 signal and beam 2 signal are equal. Alternatively, or additionally, the variable gain may be adjusted or determined during or after manufacture of the circuit, as desired. This variable gain may be used to ensure a zero crossing signal upon subtraction (e.g. as shown in FIG. 25B). Then, the control circuit may adjust the sensing motion structure 235 continuously during operation to achieve a zero error signal at system output. Where a low pass filter or other circuitry is not used, the control circuit may force the actuator to operate only below a certain frequency (e.g. 20 Hz) and allow higher frequency signals of interest to pass to system output.

Thus, instead of modifying the intensity of one of the beam's signal, as described above regarding FIG. 26, the position of the sensing structure may be modified based on the subtraction of the two signals. Embodiments where system output is provided from the subtraction of the two beam signals may be referred to as "semi-closed loop" embodiments. In embodiments described below, where the control circuit may force the error signal (i.e., the system output of FIG. 27) to zero at all frequencies, the system output may be provided from the output of the control circuit. Such embodiments may be referred to as "force feedback" embodiments.

Thus, the sensing structure's motion can be controlled as a means to ensure proper subtraction of beam strengths with zero output. This may ensure that the system operates at a zero-crossing at all times, which may be referred to as "autotuning". Thus, autotuning may ensure that the microphone operates about a point of linearity, shown as the "operating point" in FIG. 25B.

In addition to autotuning, this procedure automatically ensures subtraction of balanced beams for RIN cancellation. Thus, the autotuning method may ensure both linear operation and maximum sensitivity by setting the distance "d" between the sensing structure and the grating structure to a point of quadrature. FIG. 25B illustrates the theoretically predicted relationship between the light intensity of the diffracted beams and the gap distance "d" for the grating based system in FIG. 24. Therefore, the difference signal (e.g., $I_0-[I_1+I_2]$) may be used as the photo detector output. As already indicated, the linear operating region is highlighted in the Figure. The slope of this curve may represent the displacement sensitivity of the detection method (after amplification through a photocurrent-to-voltage amplifier, the units of the y-axis are in volts, and the sensitivity is therefore expressed in V/m).

Note that the signal amplitudes of FIG. 25B are representative of the signals of one particular embodiment; however, the exact amplitudes may vary. One important detail to note is that the original signals (shown in FIG. 25A) are positive only—changing from zero to some normalized intensity. For the combined signals, shown in the FIG. 25B, the signals may be centered about zero. The difference signal combines the signal power of the complementary orders and removes the DC bias as well as the laser intensity noise (when autotuned). Assuming the photodiodes are discrete, the difference signal can be obtained directly through photocurrent subtraction as shown in the circuit diagram of FIG. 28A (based on the block diagram of FIG. 27).

However, in cases where the cathodes share a common electrical connection, for example in a monolithic photodiode array, direct photocurrent subtraction may not be possible. In these cases, signal subtraction and autotuning can be accomplished using various embodiments described below. However, note that these embodiments are exemplary only and other types of implementations (e.g., digital or analog) are envisioned. For example, any or all of the circuit diagrams shown (e.g., FIGS. 28A-D, 30, and 32) may be implemented as a portion of the circuit 210. In some embodiments, while the functionality shown in the circuits may be the same, the actual layout (e.g., within an ASIC) may be different than shown.

Figure 27:
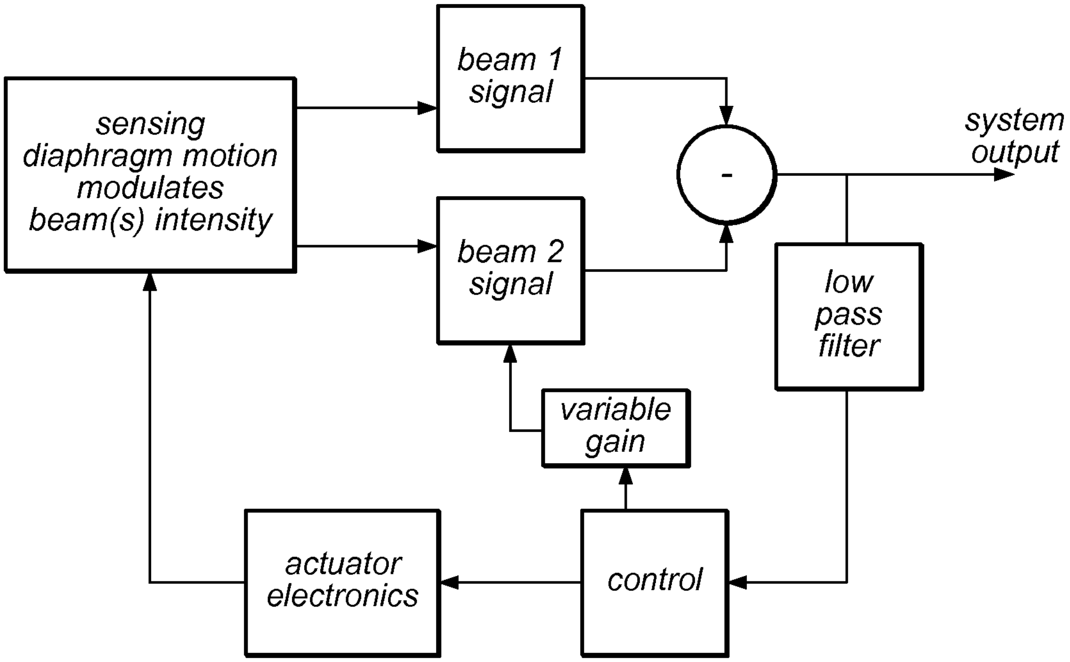
Figure 28A:
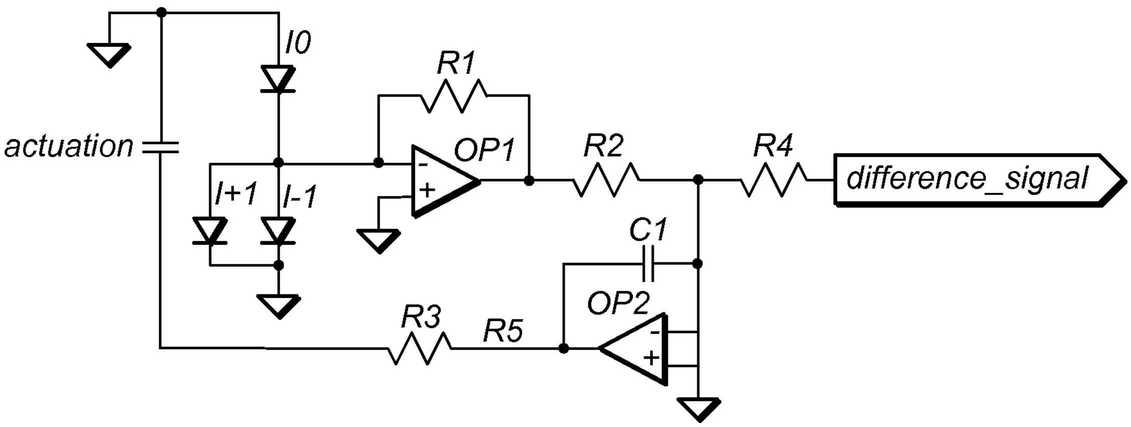
Figure 28B:
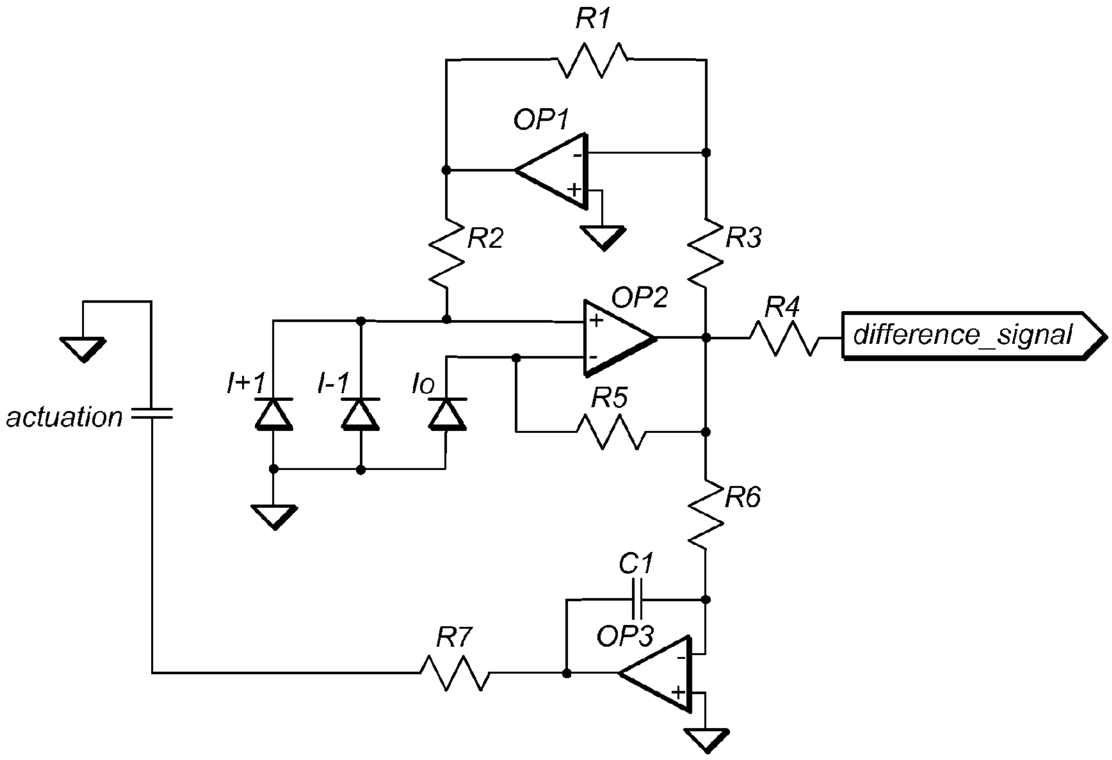

FIG. 28B illustrates a second embodiment of an electronic schematic for obtaining the autotuned difference signal given a common cathode photodiode configuration (based on the block diagram of FIG. 27). In this circuit, photodiode currents $I_{+1}$ and $I_{-1}$ are regulated by the amplifier OP1 to match the current $I_0$. OP3 then integrates the offset error and feeds that signal back to the actuator which adjusts the gap height "d" to the optimal operating point as shown in FIG. 25B.

Figure 28C:
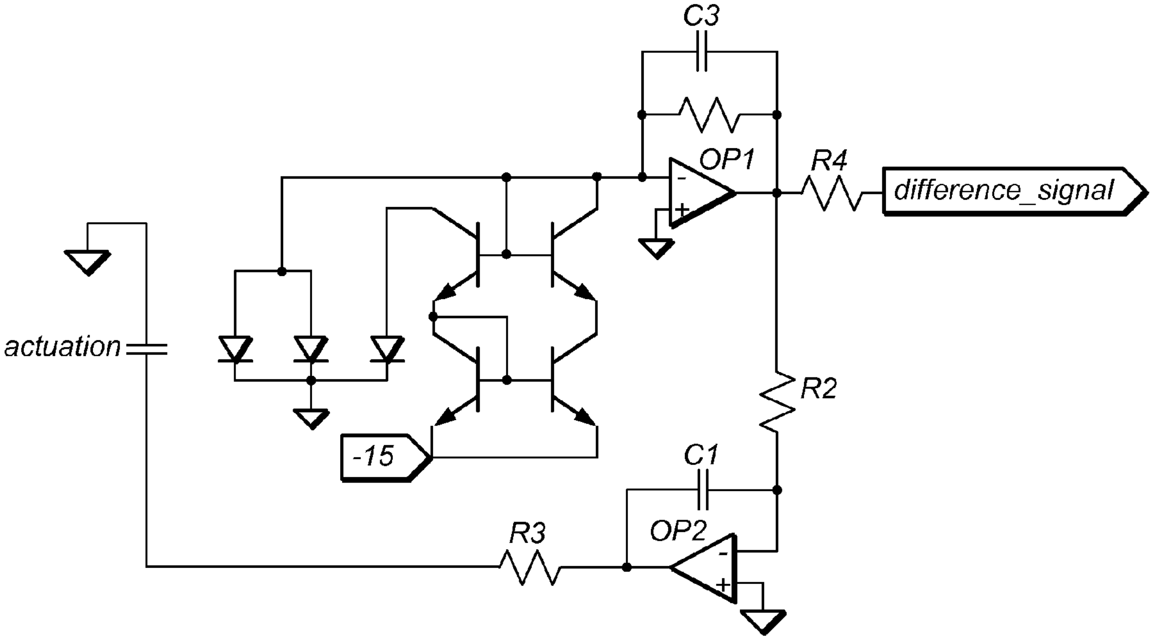

FIG. 28C illustrates a third embodiment of an electronic schematic where a traditional current mirror design is used to rectify the complementary photocurrent signals before they enter the transimpedance amplifier OP1 (based on the block diagram of FIG. 27). The resulting photocurrent is amplified by OP1 to produce the difference signal that is output and sent to the feedback integrator OP2. A system that amplifies the photodetector current signals into voltages and then uses an operational amplifier to subtract these voltages.

Said another way, this system may take current $I_0$ and mirror it with $I_{+1}, I_{-1}$. The difference of the currents may then be amplified by OP1 and output as the difference signal that is also input to the feedback integrator composed of OP2. Again, an integrator is added in feedback to set the appropriate gap distance "d".

Figure 28D:
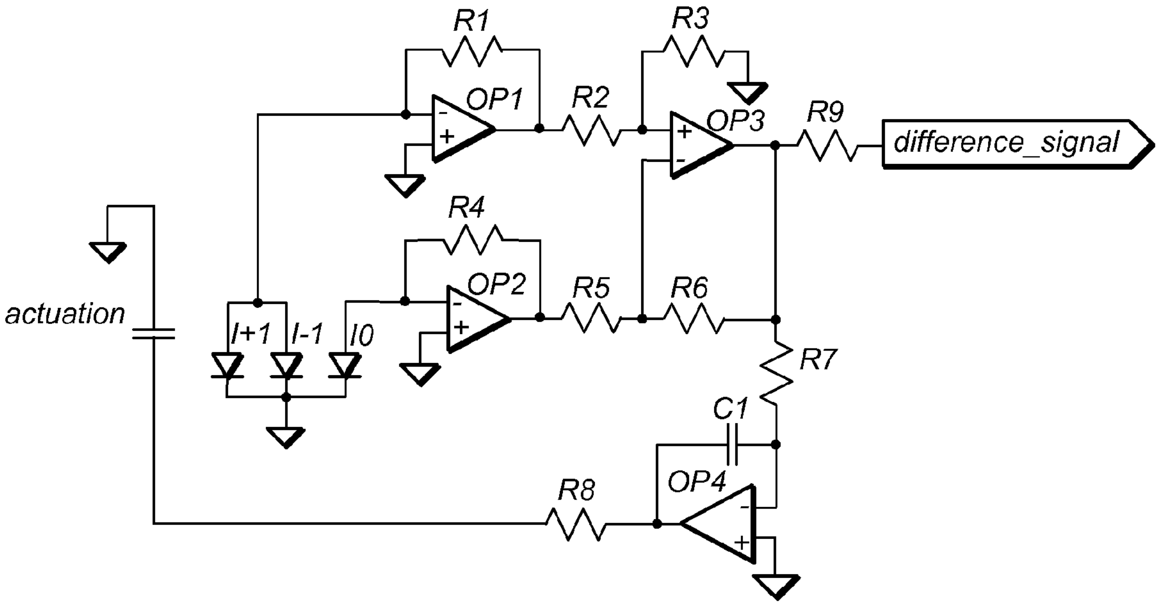

FIG. 28D illustrates a fourth embodiment of an electronic schematic where the two photocurrents are amplified individually and then the signals in the voltage domain are subtracted before integrating the offset error and feeding it back to the actuator (based on the block diagram of FIG. 27). In this circuit, OP1 amplifies the current from the $1^{st}$ order diffraction intensity, OP2 amplifies the current from the $2^{nd}$ order diffraction intensity, OP3 subtracts these signals, and OP4 integrates the signal for feedback to the actuator. As shown in FIG. 28D, the current from orders ($I_1$, $I_{-1}$) is amplified by OP1, the current from $I_0$ is amplified by OP2. Amplifier OP3 subtracts these voltage signals to produce the difference signal that is output and sent to the feedback integrator OP4. OP3 can also be used to apply different gains to individual photocurrent intensities.

Figure 29:
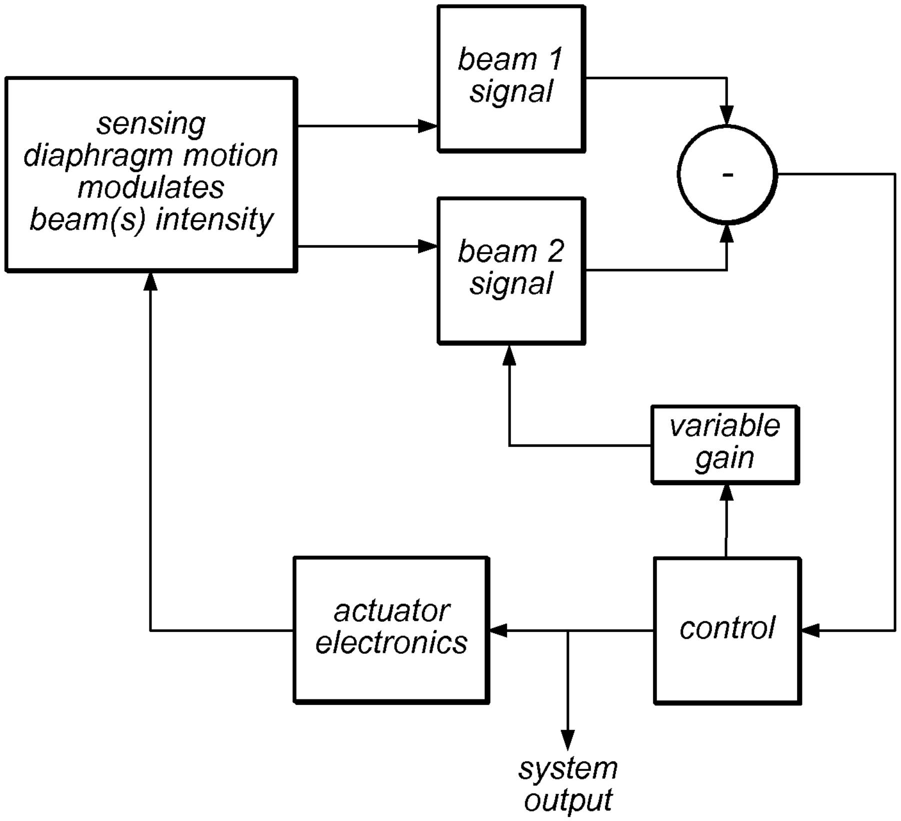

FIG. 29 is a block diagram of a system in which the output microphone signal is also the error signal used in feedback. This is realizable due to the presence of the low pass filter (LPF). Signals below the audio band of interest (e.g., 20 Hz) may be used as the error signal, while signals within the audio band may appear at the output. Note that FIG. 29 may be modified to remove the LPF. Accordingly, the system output may be the error signal and may contain all frequencies. This arrangement is known as force feedback.

Figure 28E:
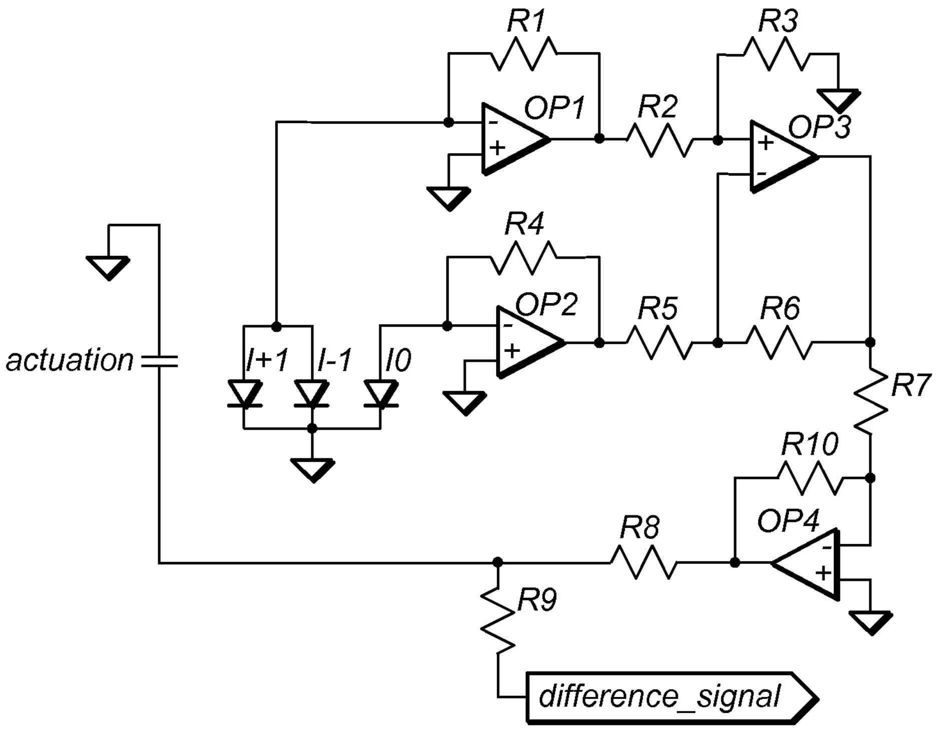

FIG. 28E illustrates an embodiment of an electronic schematic similar to FIG. 28D, but following the block diagram of FIG. 29. This schematic is similar to that of FIG. 28D, with the exception that the output signal of the system is taken as the signal is fed to the actuator. In addition, the control scheme defined by OP4 is a proportional amplifier as opposed to an integrator. The proportional control amplifier (OP4) is functional throughout the entire audio bandwidth, and this is therefore a force feedback configuration.

Note that the modifications made to FIG. 28D to produce FIG. 28E may be applied to FIGS. 28A-28C or any electronic schematics performing the functionality described above.

The methods described above provide a means for cancelling laser RIN. These methods are effective at cancelling RIN in the audio range (20 Hz-20 kHz). However, much slower, and much larger amplitude variations in laser intensity output can occur due to temperature changes. It may be desirable to stabilize the output sensitivity of a microphone between the temperature range −30 to 70 degrees Celsius. Across this temperature range, the behavior of VCSEL output light power vs. injection current can vary greatly. The injection current may be controlled to regulate the output power of the VCSEL. The addition of beam signals can be used to provide the total output of the VCSEL, and the injection current provided to the light source may be adjusted based on the added beam signal strength. This may be achieved via a variety of methods: 1) having this feedback operate very slowly (e.g. below 20 Hz), which may stabilize output sensitivity and 2) having this feedback operate very quickly (i.e. up to 200 kHz), which may reduce the RIN output of the laser, among other possibilities.

Figure 28F:
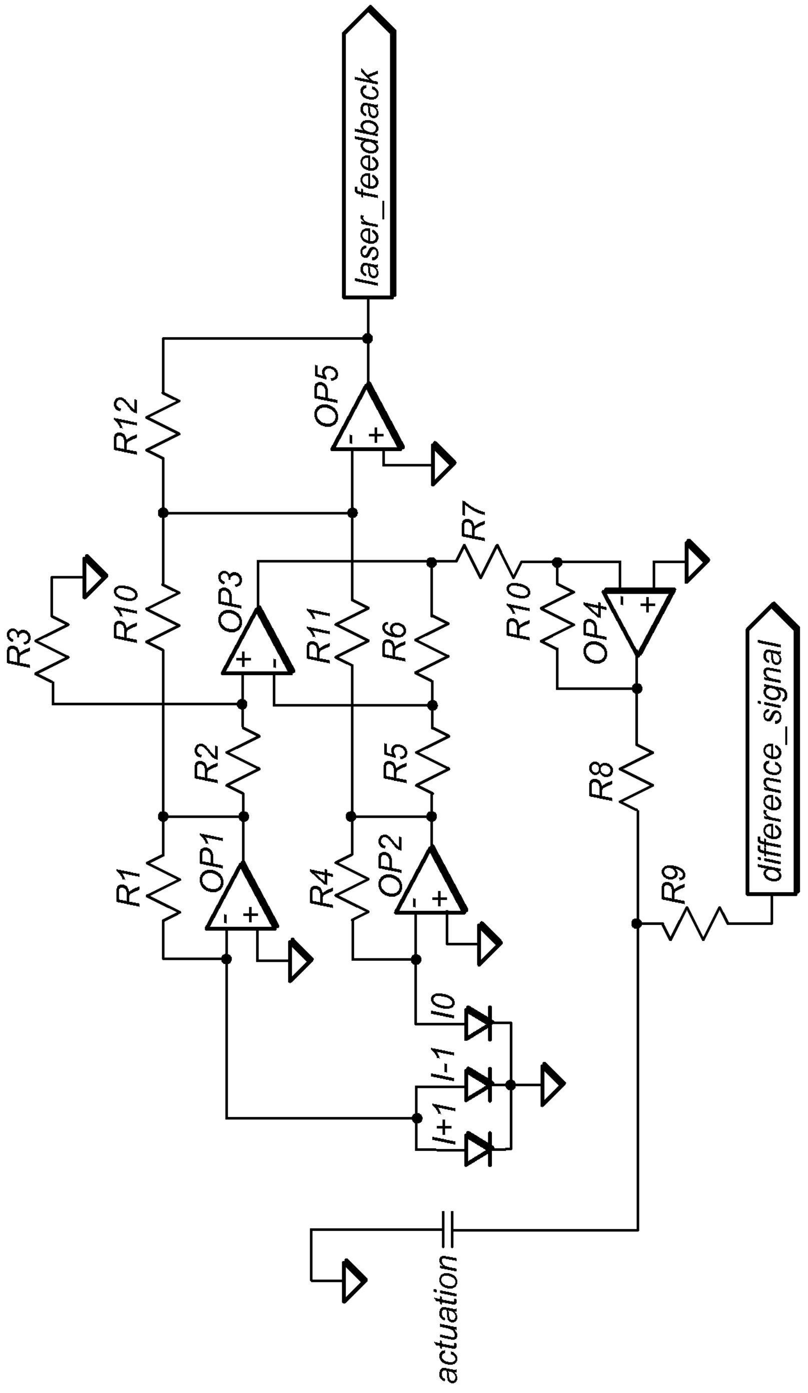
Figure 30:
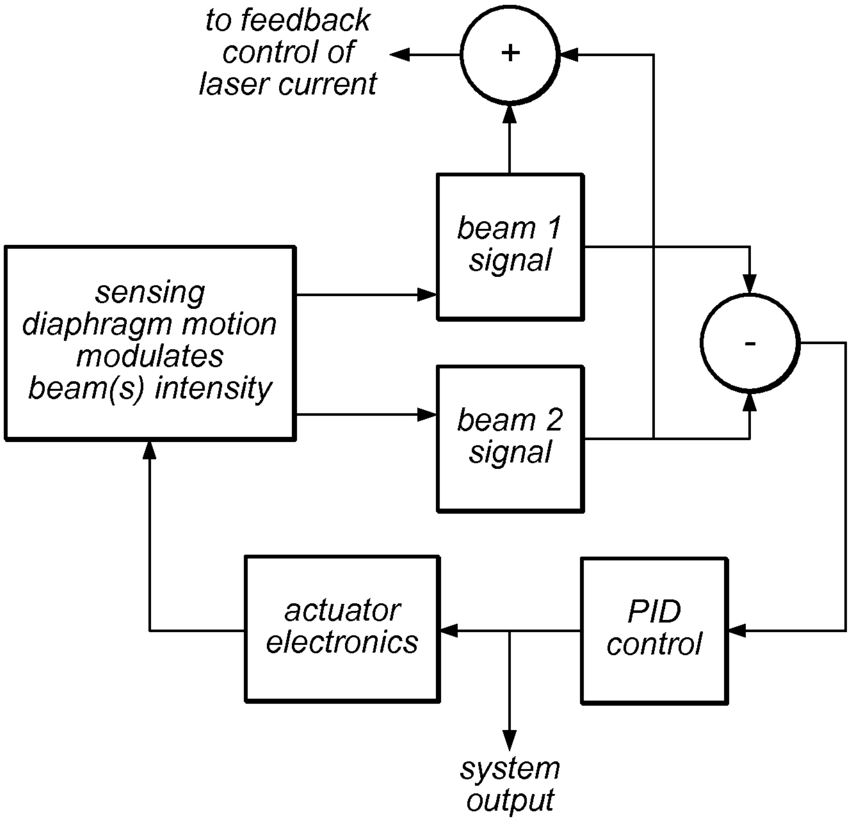

FIG. 28F illustrates an embodiment of an electronic schematic following the block diagram of FIG. 30. This schematic is similar to that of FIG. 28D, with the addition that the beam signals are added using amplifier OP5, which provides the total output intensity. This in turn may be used to control the injection current to the laser (denoted with the arrow "laser feedback" in the Figure).

Note that the modifications made to FIG. 28D to produce FIG. 28F may be applied to FIGS. 28A-28C or any electronic schematics performing the functionality described above.

In addition to controlling the nominal or slow varying power output of the VCSEL using the added beam signal, this same feedback configuration can be run faster and used to reduce RIN across frequencies 20 Hz-20 kHz.

Figure 31:
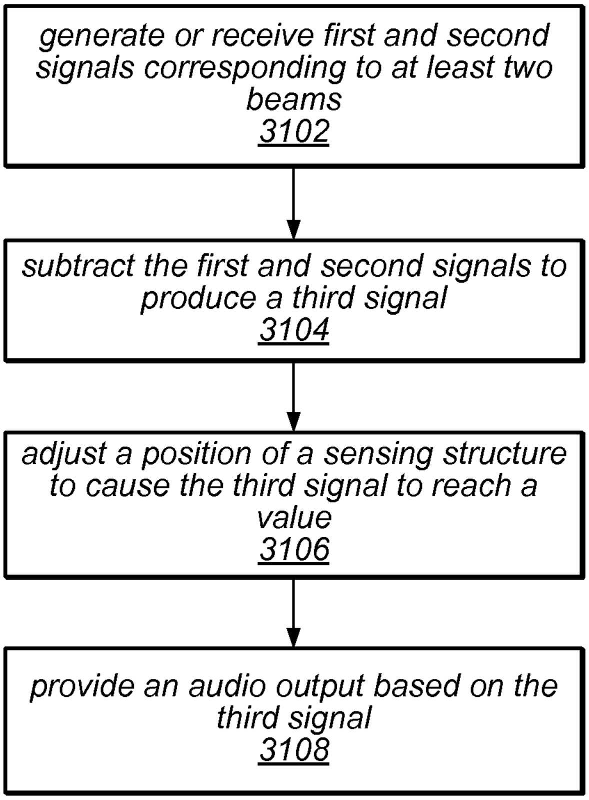
FIG. 31 is a flowchart diagram illustrating one embodiment of a method for processing signals from, or within, a microphone.

FIG. 31—Performing Signal Processing of an Optical Microphone

FIG. 31 illustrates an exemplary method for performing signal processing of an optical microphone. The method shown in FIG. 33 may be used in conjunction with any of the systems or devices shown in the above Figures, among other devices. In various embodiments, some of the method elements shown may be performed concurrently, performed in a different order than shown, or omitted. Additional method elements (e.g., laser injection current control) may also be performed as desired. As shown, this method may operate as follows.

In 3102, first and second signals may be generated or received which correspond to at least two beams. The first and second signals may be complementary signals.

In some embodiments, the at least two beams may be created based on a common light source. For example, a light source may produce at least a first beam (or laser light). The first beam may produce a zero order reflection beam and a plurality of higher order diffracted beams, e.g., after returning (e.g., reflecting) from a sensing structure and possibly a diffraction grating of the microphone. These beams may be detected using one or more photo detectors. In some embodiments, there may be a photo detector for each received beam; however, the photo detectors may be discrete or monolithic, as desired. Accordingly, the first and second signals may be generated (e.g., by a circuit and/or the photo detectors) based on the intensity of the received beams via detection by the one or more photo detectors. In one embodiment, the first signal may be proportional to the intensity of the zero order reflection beam and the second signal may be proportional to the intensity of the sum of the plurality of higher order diffracted beams. For example, the first signal may be the original or a modified version of the signal provided by a photo detector corresponding to the zero order reflection beam. Similarly, the second signal may be the sum of the original or modified versions of the signals provided by the photo detectors receiving the higher order diffracted beams. Thus, the first and second signals may be generated or derived from reflected/diffracted beams, such as described herein and in various ones of the references incorporated above.

Alternatively, the first and second signals may be based on reflection and transmission beams from the sensing structure, such as described herein and in various ones of the references incorporated above. The signals resulting from these beams (e.g., as detected by the photo detectors) may be complementary. The first and second signals may simply be the detected signals from each beam and may be provided by the photo detectors. Note that further embodiments and alternatives are envisioned other than the simple reflection or more complex diffraction schemes described above.

In 3104, the first signal and the second signal may be subtracted to produce a third signal. The first and second signals may be subtracted using a current mirror. In some embodiments, the first and second signals may be current signals and the subtraction may be performed using the current signals (e.g., when the photo detectors are discrete). In these cases, the third signal may be converted to a voltage signal after subtraction using a current-to-voltage amplifier. However, in further embodiments, the first and second signals may be voltage signals (e.g., when the photo detectors are monolithic). Note that in some embodiments, the current may be digitized and then signal processing (such as addition, subtraction, etc.) may be performed.

In 3106, a position of the sensing structure may be adjusted to cause the third signal to reach a first value, e.g., zero. The adjustment may be performed based on the third signal. The feedback loop for adjusting the position of the sensing structure may be implemented via any of the methods described above, among other possibilities.

For example, in one embodiment, a low pass filter (LPF) may be applied to the third signal to produce a filtered third signal, and the adjustment described above may be based on the filtered third signal.

Alternatively, the position of the sensing structure may be controlled as to result in a zero value for the third signal substantially at all time. For example, in one embodiment, control (e.g., PID control) may be applied to the third signal to produce a controlled signal. Accordingly, the adjusting may be performed based on the controlled signal. However, in this embodiment, the adjustment may not include applying a LPF to the third signal. Thus, by automatically tuning the sensing structure position such that the third signal is zero, the signal output is centered in the linear region shown in FIG. 25B, greater sensitivity may be provided, and laser intensity noise may be cancelled.

In 3308, an audio output signal may be provided based on the third signal. Note that the third signal may be provided as audio output directly as in semi-closed embodiments, or the signal sent to the actuating electronics may be derived as the signal output (e.g., in force feedback embodiments), although others are envisioned. Additionally, the audio output may be conditioned or buffered before being provided as the audio output, as desired.

Further Embodiments

In some embodiments, pulsing the semiconductor laser with a low duty cycle can substantially reduce power; however, this power reduction comes at the expense of reduced signal to noise ratio (SNR). A trade-off therefore exists between SNR and low power consumption. In one embodiment the microphone system (e.g., the integrated circuit) may monitor the level of ambient background noise and adjust the duty cycle to the light source accordingly. When the microphone is an environment with low sound levels as determined by the microphone (as would be the case when operated indoors in a quiet office building, for example), the duty cycle may be increased, since good SNR is important in such circumstances. When the microphone finds itself in an environment with loud ambient background levels, the duty cycle is reduced since good SNR is not required and power can be saved.

In a similar fashion, the control mechanism for the duty cycle need not be based on background noise level alone. For example, if the user is taking advantage of directionality features or ambient noise reduction algorithms that require high performance, these could also serve as the trigger for increased duty cycle and therefore increased SNR.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for performing signal processing for an optical microphone, comprising:

generate or receive first and second signals corresponding to at least two beams, wherein the first and second signals are complementary, wherein the first and second signals are based on signals provided by one or more photo detectors, wherein the one or more photo detectors receive the at least two beams after returning from a sensing structure;

subtracting the first signal and the second signal to produce a third signal;

adjusting a position of the sensing structure to cause the third signal to reach a first value, wherein said adjusting is performed based on the third signal;

providing an audio output signal based on the third signal.

2. The method of claim 1, further comprising:

adjusting a gain of the second signal prior to subtraction to ensure a zero crossing third signal.

3. The method of claim 1, wherein the first value is zero, wherein the audio output signal corresponds to the position adjustment of the sensing structure performed in said adjusting.

4. The method of claim 1, wherein the first signal is received and is proportional to a zero order reflected beam, wherein the second signal is generated and is proportional to the sum of a plurality of higher order diffracted beams, and wherein the one or more photo detectors receive the at least two beams after returning from both the sensing structure and a diffraction grating.

5. The method of claim 1, wherein the first signal is received and is proportional to a reflected beam from the sensing structure, wherein the second signal is generated and is proportional to a transmitted beam passing through the sensing structure.

6. The method of claim 1, further comprising:

applying a low pass filter (LPF) to the third signal to produce a filtered third signal;

wherein said adjusting the position of the sensing structure is performed based on the filtered third signal.

7. The method of claim 1, wherein the first value is a time averaged value, wherein said adjusting the position of the sensing structure is performed to cause a time averaged value of the third signal to reach the first value.

8. The method of claim 1, further comprising:

applying feedback control to the third signal to produce a controlled signal;

wherein said providing the audio output signal is based on the controlled signal, wherein said adjusting the position of the sensing structure is performed based on the controlled signal.

9. The method of claim 1, wherein the at least two beams are created based on a light source, and wherein the method further comprises:

adding the first and second signals to produce a total beam signal strength;

adjusting power provided to the light source based on the total beam signal strength.

10. The method of claim 1, wherein the one or more photo detectors comprise a discrete photo detector for each beam of the at least two beams.

11. The method of claim 10, wherein the first signal and the second signal are current signals, and wherein the method further comprises:

converting the third signal to a voltage signal using a current-to-voltage amplifier.

12. The method of claim 1, wherein the at least two beams are created based on a light source, wherein the light source is pulsed according to a duty cycle in order to save power, and wherein the duty cycle is actively controlled based on ambient acoustic conditions.

13. The method of claim 1, wherein the at least two beams are created based on a light source, wherein the light source is pulsed according to a duty cycle in order to save power, and wherein the duty cycle is actively controlled based on a mode of operation of the microphone.

14. The method of claim 1, wherein said subtracting the first signal and the second signal comprises using a current mirror.

15. An optical microphone, comprising:

a light source configured to transmit one or more beams to a sensing structure;

one or more photo detectors, wherein the one or more photo detectors are configured to receive at least two beams after return from the sensing structure, wherein the one or more photo detectors measure acoustic vibrations of the sensing structure, wherein the one or more photo detectors are configured to generate electrical signals corresponding to the at least two beams;

a circuit coupled to the one or more photo detectors, wherein the circuit is configured to:

generate or receive first and second signals based on the electrical signals of the one or more photo detectors, wherein the first and second signals are complementary;

subtract the first signal and the second signal to produce a third signal;

adjust a position of the sensing structure to cause the third signal to reach a first value, wherein said adjusting is performed based on the third signal; and provide an audio output signal based on the third signal.

16. The system of claim 15, wherein the circuit is configured to:

adjust a gain of the second signal prior to subtraction to ensure a zero crossing third signal.

17. The system of claim 15, wherein the first value is zero, wherein the audio output signal corresponds to the position adjustment of the sensing structure performed in said adjusting.

18. The system of claim 15, wherein the one or more beams comprise a single beam, wherein the first signal is received and is proportional to a zero order reflected beam, wherein the second signal is generated and is proportional to the sum of a plurality of higher order diffracted beams, and wherein the one or more photo detectors receive the at least two beams after returning from both the sensing structure and a diffraction grating.

19. The system of claim 15, wherein the first signal is received and is proportional to a reflected beam from the sensing structure, wherein the second signal is generated and is proportional to a transmitted beam passing through the sensing structure.

20. The system of claim 15, wherein the circuit is further configured to:

apply a low pass filter (LPF) to the third signal to produce a filtered third signal;

wherein said adjusting the position of the sensing structure is performed based on the filtered third signal.

21. The system of claim 15, wherein the first value is a time averaged value, wherein said adjusting the position of the sensing structure is performed to cause a time averaged value of the third signal to reach the first value.

22. The system of claim 15, wherein the circuit is further configured to:

apply feedback control to the third signal to produce a controlled signal;

wherein said providing the audio output signal is based on the controlled signal, wherein said adjusting the position of the sensing structure is performed based on the controlled signal.

23. The system of claim 15, wherein the circuit is further configured to:

add the first and second signals to produce a total beam signal strength;

adjust power provided to the light source based on the total beam signal strength.

24. The system of claim 15, wherein the one or more photo detectors comprise a discrete photo detector for each beam of the at least two beams, wherein the first signal and the second signal are current signals, and wherein the circuit is further configured to:

convert the third signal to a voltage signal using a current-to-voltage amplifier.

25. The system of claim 15, wherein the light source is pulsed according to a duty cycle in order to save power, and wherein the duty cycle is actively controlled based on ambient acoustic conditions.

26. The system of claim 15, wherein the light source is pulsed according to a duty cycle in order to save power, and wherein the duty cycle is actively controlled based on a mode of operation of the microphone.

27. The system of claim 15, wherein said subtracting the first signal and the second signal comprises using a current mirror.

* * * * *